US012793686B2

(12) United States Patent
Singh et al.

(10) Patent No.: US 12,793,686 B2
(45) Date of Patent: Nov. 10, 2026

(54) NOISE SPECTRUM CHARACTERIZATION DEVICE TO CAPTURE NOISE SIGNATURE FOR SERVER INFRASTRUCTURE

(71) Applicant: Dell Products L.P., Round Rock, TX (US)

(72) Inventors: Tejinder Singh, Manotick (CA); Navjot Kaur Khaira, Manotick (CA)

(73) Assignee: DELL PRODUCTS L.P., Round Rock, TX (US)

( * ) Notice: Subject to any disclaimer, the term of this patent is extended or adjusted under 35 U.S.C. 154(b) by 167 days.

(21) Appl. No.: 18/814,081

(22) Filed: Aug. 23, 2024

(65) Prior Publication Data

US 2026/0057873 A1 Feb. 26, 2026

(51) Int. Cl.
*G10K 11/172* (2006.01)
*H04R 5/027* (2006.01)

(52) U.S. Cl.
CPC ........... *G10K 11/172* (2013.01); *H04R 5/027* (2013.01)

(58) Field of Classification Search
CPC .............................. G10K 11/172; H04R 5/027
USPC ................... 381/71.1–71.3, 71.5, 71.7, 71.8; 181/205, 207, 308
See application file for complete search history.

(56) References Cited

U.S. PATENT DOCUMENTS

2002/0149070 A1* 10/2002 Sheplak ................. H04R 3/005 257/415
2021/0174186 A1* 6/2021 Bowen ................... G06N 3/045
2021/0383787 A1* 12/2021 Sorbel .................... G10K 11/32
2022/0180853 A1* 6/2022 Memoli ................. G10K 11/26
2025/0029589 A1* 1/2025 Chen ...................... G10K 11/36
2025/0201225 A1 6/2025 Singh et al.

OTHER PUBLICATIONS

"APC NetShelter Soundproof, 32U, Server Rack Enclosure, 120V, Maple [TAA]—AR4032A" Schneider Electric. [https://www.se.com/us/en/product/AR4032A/apc-netshelter-soundproof-32u-server-rack-enclosure-120v-maple-taa/] retrieved Feb. 9, 2026, 15 pages.

(Continued)

*Primary Examiner* — Vivian C Chin
*Assistant Examiner* — Con P Tran
(74) *Attorney, Agent, or Firm* — Amin, Turocy & Watson, LLP

(57) ABSTRACT

The technology described herein is directed towards collecting detailed noise spectra measured from one or more servers (or similar devices) via an array of microphones, which can be positioned to capture the noise spectra in a suitable test environment. Based on the noise spectra, a metasurface of unit cells based on the principles of Helmholtz resonators, is designed. The noise spectra are maintained in a data store/database, along with hardware feature data of the measured device. The database returns the server noise profile, from which a metasurface's unit cell design parameters suitable for server noise suppression are configured, e.g., printed by a 3D printer and deployed for use with the server. The database can be used for a non-measured server with similar hardware feature data to measured servers, to estimate the noise peaks of the non-measured server from which a noise-canceling metasurface's unit cell parameters can be determined.

20 Claims, 19 Drawing Sheets

(56) References Cited

OTHER PUBLICATIONS

"Quiet-Duct® Silencers—A Complete Range of Engineered Noise Control for Air Handling Systems" iac acoustics. [https://www.iacacoustics.com/files/content/literature/hvac-silencers/Duct-Silencer-Brochure.pdf] retrieved Feb. 9, 2026, 8 pages.
"Dell EMC PowerEdge R6615" Dell Technologies. [https://www.delltechnologies.com/asset/en-us/products/servers/technical-support/poweredge-r6615-spec-sheet.pdf], Dec. 2023, 3 pages.
S. K. Goudos, P. D. Diamantoulakis, M. A. Matin, P. Sarigiannidis, S. Wan and G. K. Karagiannidis, "Design of Antennas through Artificial Intelligence: State of the Art and Challenges," in IEEE Communications Magazine, vol. 60, No. 12, Dec. 2022, 7 pages.
H. M. E. Misilmani and T. Naous, "Machine Learning in Antenna Design: An Overview on Machine Learning Concept and Algorithms," 2019 International Conference on High Performance Computing & Simulation (HPCS), Dublin, Ireland, 2019, 8 pages.
J. P. Jacobs and S. Koziel, "Two-Stage Framework for Efficient Gaussian Process Modeling of Antenna Input Characteristics," in IEEE Transactions on Antennas and Propagation, vol. 62, No. 2, Feb. 2014, 8 pages.
Singh, et al. "Acoustic Metasurface Configuration for Suppressing Noise in a Server Rack Having a Combination of Multiple Units" U.S. Appl. No. 18/813,966, filed Aug. 23, 2024, 60 pages.
Singh, et al. "Standardized Noise Suppression Metasurface Module as an Add-on Feature for Broad Server Compatibility" U.S. Appl. No. 18/814,016, filed Aug. 23, 2024, 58 pages.
Singh, et al. "Model-Based Automated Metasurface Configuration to Suppress Individual Noise Peaks" U.S. Appl. No. 18/814,103, filed Aug. 23, 2024, 57 pages.

* cited by examiner

NOISE SPECTRUM CHARACTERIZATION DEVICE TO CAPTURE NOISE SIGNATURE FOR SERVER INFRASTRUCTURE

RELATED APPLICATIONS

The subject patent application is related to U.S. patent application Ser. No. 18/813,966, filed Aug. 23, 2024, and entitled "ACOUSTIC METASURFACE CONFIGURATION FOR SUPPRESSING NOISE IN A SERVER RACK HAVING A COMBINATION OF MULTIPLE UNITS", U.S. patent application Ser. No. 18/814,016, filed Aug. 23, 2024, and entitled "STANDARDIZED NOISE SUPPRESSION METASURFACE MODULE AS AN ADD-ON FEATURE FOR BROAD SERVER COMPATIBILITY", and U.S. patent application Ser. No. 18/814,103, filed Aug. 23, 2024, and entitled "MODEL-BASED AUTOMATED METASURFACE CONFIGURATION TO SUPPRESS INDIVIDUAL NOISE PEAKS", the entireties of which patent applications are hereby incorporated by reference herein.

BACKGROUND

Servers and other devices (e.g., storage arrays) generate undesirable noise. Acoustic absorbers are specialized materials or structures designed to mitigate the effects of sound reflections, echoes, and reverberations in various environments, including environments in which servers are deployed. These absorbers function by capturing sound waves and converting their energy into heat, effectively reducing the intensity of the sound waves and preventing them from bouncing off surfaces and causing unwanted sound reflections. They are typically engineered using porous materials with intricate structures that allow sound waves to penetrate deep into the material, where the acoustic energy is dissipated as thermal energy through friction and air resistance.

Existing acoustic absorbers come in various forms, including foam panels, fabric-wrapped panels, diffusers, bass traps, and more. One of the problems with existing acoustic absorbers is that they are not desirable in certain heat-sensitive environments. For example, servers generate a lot of heat and thus are designed with fans to cool dissipate the heat; however, fans can generate a lot of annoying noise. Using existing acoustic absorbers to absorb server noise reduces the noise but can significantly reduce dissipation of the heat generated by servers, which can result in high heat levels that can reduce server performance and possibly cause a server to shut down to avoid damage from overheating.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
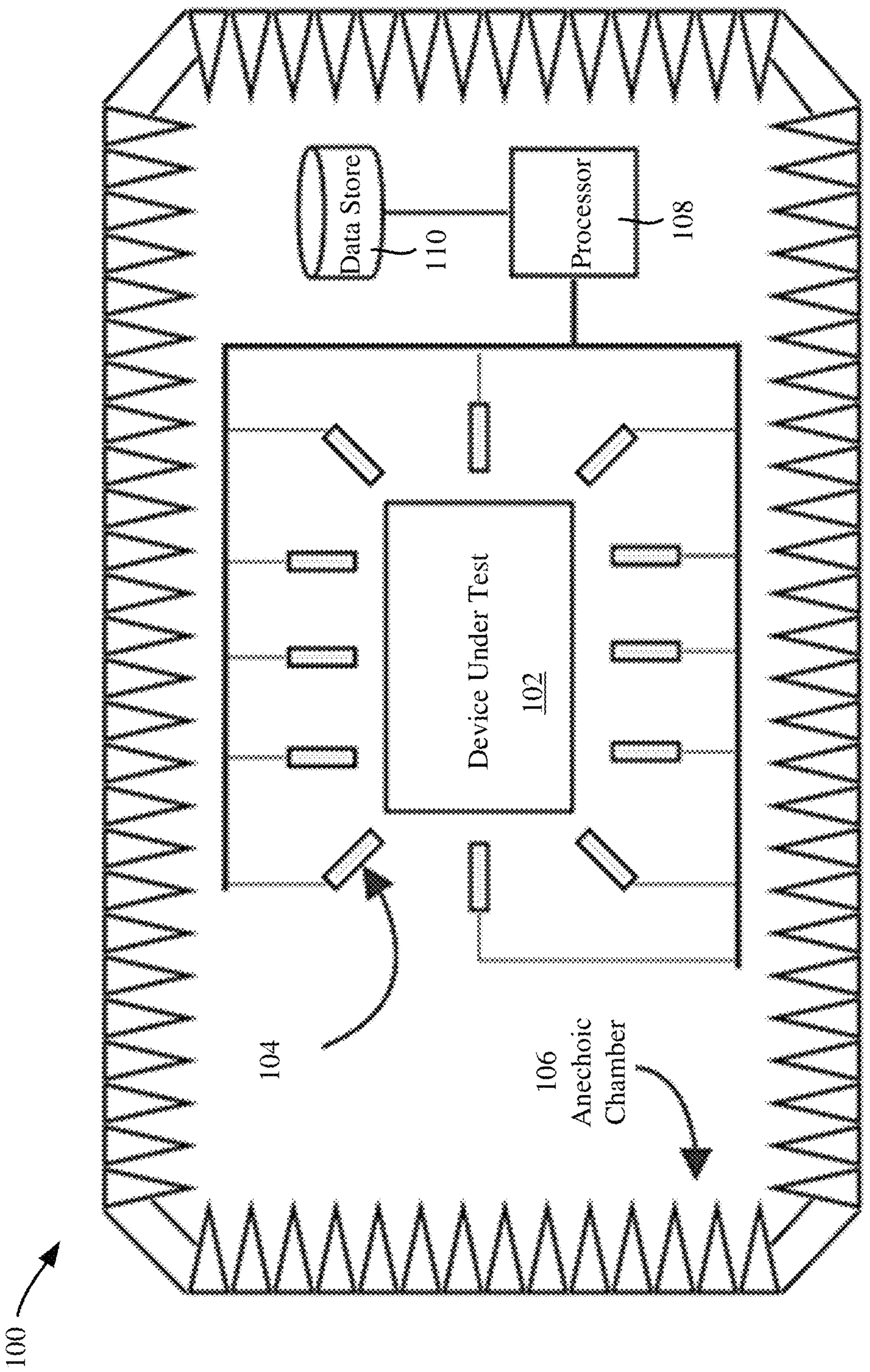
FIG. 1 is a representation of an example noise characterization setup in an anechoic chamber for capturing a devices noise profile data, in accordance with various embodiments and implementations of the subject disclosure.

Various embodiments and implementations of the technology described herein are generally directed towards collecting detailed noise spectra from various servers via an array of microphones, which can be positioned to capture the noise spectra in a suitable test environment, such as an anechoic chamber. Based on the collected noise data, this facilitates a design process for the creation of customized metasurfaces tailored to the unique noise characteristics of each server model, such as noise floor, number of peaks, bandwidth, and amplitude. By testing individual server classes and models under steady-state conditions and various setup scenarios, a comprehensive data store can be developed for the tested devices, e.g., providing a database of noise profile data for each device. As described herein, this data store serves as a foundation for developing one or more metasurfaces optimized for each server's specific noise features, significantly enhancing noise suppression capabilities.

The sound absorption metasurfaces, based on inverted phase cancellation, and more particularly towards an acoustic absorbing metasurface based on the principles of Helmholtz resonators, can be designed for absorbing single frequency, wideband or multifrequency acoustic waves (noise) emanating from one or more server fans. Significantly, the use of metasurfaces as described herein does not increase the heat levels of computing devices substantially, compared to existing technologies for sound absorption that do not facilitate ventilation/do not dissipate the heat very well.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. It also should be noted that terms used herein, such as "optimize," "optimization," "optimal," "optimally" and the like only represent objectives to move towards a more optimal state, rather than necessarily obtaining ideal results. For example, "optimal" placement of a subnet means selecting a more optimal subnet over another option, rather than necessarily achieving an optimal result. Similarly, "maximize" means moving towards a maximal state (e.g., up to some processing capacity limit), not necessarily achieving such a state.

Further, it is to be understood that the present disclosure will be described in terms of a given illustrative architecture; however, other architectures, structures, substrate materials and process features, and steps can be varied within the scope of the present disclosure.

It will also be understood that when an element such as a layer, region or substrate is referred to as being "on" or "over" another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

FIG. 1 shows a generalized block diagram of an example system 100 corresponding to a noise testing scenario of device under test 102, such as a server. The system 100 is not limited to servers, but can capture the noise profile data of any appropriate devices, such as a storage arrays, routers and switches, or power distribution units.

In on implementation, the noise characterization of the device under test 102 starts with placing studio-grade (20 Hz-20 kHz) condenser or similar class of microphones (one of which is labeled 104) in the test environment (e.g., anechoic chamber 106) around the device under test 102 to capture the noise from various different positions. Note that the array of microphones depicted in FIG. 1 is generally arranged in a two-dimensional plane around the device under test 102, which is typically sufficient as the airflow from the device under test 102 tends to be in one direction, however it is feasible to arrange the microphones in a three-dimensional region around the device under test 102.

The electrical signals output by the microphones are sent to a processor 108, which includes a compute unit with an audio signal processing engine, for example. Data from the individual microphones or sensors is then stored in the data store 110 (e.g., database) along with the superimposed data from the combined microphones to create the noise profile data of the device under test 102. One suitable external Thunderbolt-based or PCIe-based internal audio interface can be, for example, an Avid Pro Tools Carbon or Avid MTRX Studio 16×16 interface), which is needed to record directly into computer digital audio workstation that can handle the processing of multiple streams (e.g., 8-12 channels). One measurement goal is to reduce any latency between various microphones/sensors, as such latency can generate wrong data when superimposing.

By testing individual server classes and models under steady-state conditions and various setup scenarios, the noise profile data for each such server class/model can be used to develop metasurfaces optimized for each server's specific noise features. To this end, the technology described herein facilitates the design and implementation of unit cells into metasurfaces that can be configured and positioned to efficiently absorb and dissipate sound waves of two or more specific frequencies. A metasurface can be a narrowband sound absorption device, a multiband sound absorption device, and/or a broadband sound absorption device. Each of the specific frequencies can be of any frequency/narrowband frequency range over a broad range of audible frequencies, or even subsonic (below 20 Hz)/supersonic frequencies (up to about 20,000 Hz). Two or more of the specific frequencies can be relatively far apart, whereby multiband sound absorption is facilitated for such far apart frequencies. Two or more of the specific frequencies can be relatively close together, whereby broadband sound absorption is facilitated for such close together frequencies.

Figure 2:
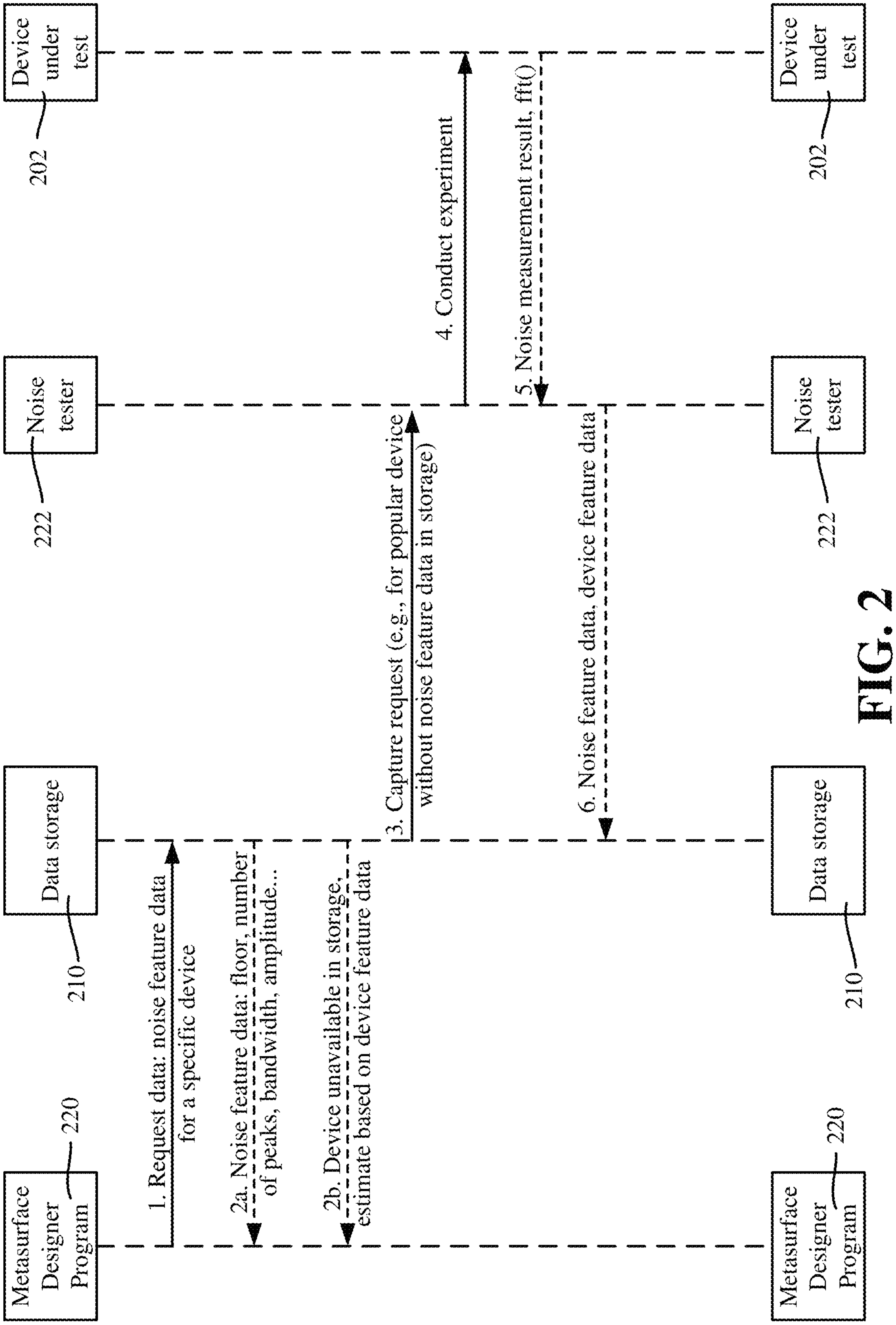
FIG. 2 is an example sequence diagram of customized metasurface design based on a comprehensive noise profile database, which can be used by artificial intelligence/machine learning (AI/ML) models by converting the captured noise spectrum into spectrum features, in accordance with various embodiments and implementations of the subject disclosure.

An example process flow is shown in sequence diagram of FIG. 2, in which a metasurface designer program 220 requests the noise feature data for a specific device from the data storage 210 (arrow (1)). If the noise feature data is present in the data storage for the specified device, e.g., the device has been previously tested, such as via the test environment of FIG. 1, the noise feature data is available, and returned (arrow (2*b*)) to the metasurface designer program 220, which designs a corresponding acoustic metasurface based on the returned the noise feature data. In the event the device data is not available in storage, then one option is to estimate the noise feature data based on device feature data, e.g., its specifications, using a trained model as described herein with reference to FIGS. 10-13.

Another option, such as for a popular device, is to test the device (e.g., as in FIG. 1) to obtain the device's noise profile data. Such a request can be sent (arrow (3)) to the noise tester 222, e.g., a program or person that schedules the test in the test environment, e.g., via the system 100 of FIG. 1. The noise tester 222 conducts the experiment (arrow (4)) on the device under test 202, and obtains the noise measurement results (arrow (5)), which is then stored as noise feature data (arrow (6)), along with the device feature data (e.g., its device identifier and its related information, such as fan data, processor type, and so on). This noise feature data is then available for designing a corresponding metasurface; the metasurface designer program 220 and/or a user who is executing the metasurface designer program 220 can be notified of the existence of the noise profile data for the device under test 202, (not explicitly shown in FIG. 2) to then restart the process at arrow (1). Moreover, because the measured noise profile data is associated with the device feature data, an AI/ML model can be trained based on the noise profile data for future use in estimating the noise profile data of the unknown device that has similar feature data to that of the tested device.

To summarize, the data store 110 (e.g., database) is developed by storing the measured noise feature data of server models, facilitating the design of highly customized device specific metasurfaces. By leveraging the data store 110, metasurface designers can create noise suppression solutions that are finely tuned to the specific noise profiles of different server classes and models, such that that each metasurface is optimized for the unique acoustic signature of its corresponding server, enhancing noise reduction while maintaining thermal and operational efficiency. It should be noted that the test environment-measured noise profile data for a server can be supplemented with noise profile data captured in an actual deployment setup for the server. The infrastructure application transforms conventional noise characterization and suppression techniques, offering a tailored and scalable solution for modern server environments.

Figure 3:
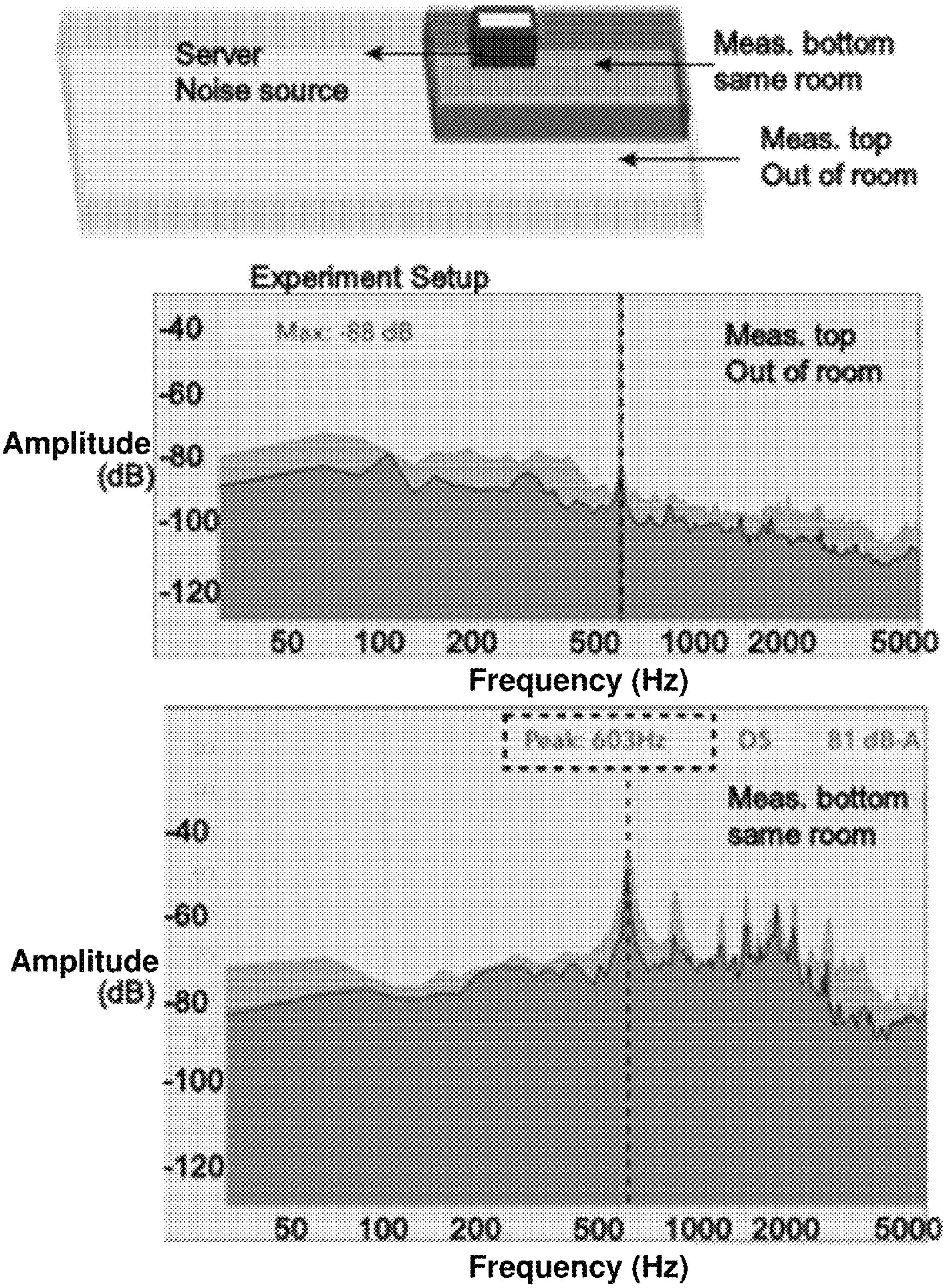
FIG. 3. is a representation of an example experimental setup and graphical representations of an example measurement result of a sound spectrum emanating from a server measured outside of and inside the same room as the server, in accordance with various embodiments and implementations of the subject disclosure.

To evaluate the overall process, the noise spectrum from individual servers was experimentally measured, as shown in the example of FIG. 3. The measurements collected detailed noise profiles from servers operating at steady-state conditions, where the fan speeds remain constant (which is typical for servers). This setup accurately captured the servers' noise characteristics, including noise floor, peak frequencies, bandwidth, and amplitude. The comprehensive profiling in an acoustically controlled environment ensured precise data collection, enabling the design of metasurfaces finely tuned to each server model. Note that each unit cell of the designed surface will primarily absorb sound at the specific frequency for which it is designed, even if incoming noise is broadband across a larger spectrum.

Figure 4A:
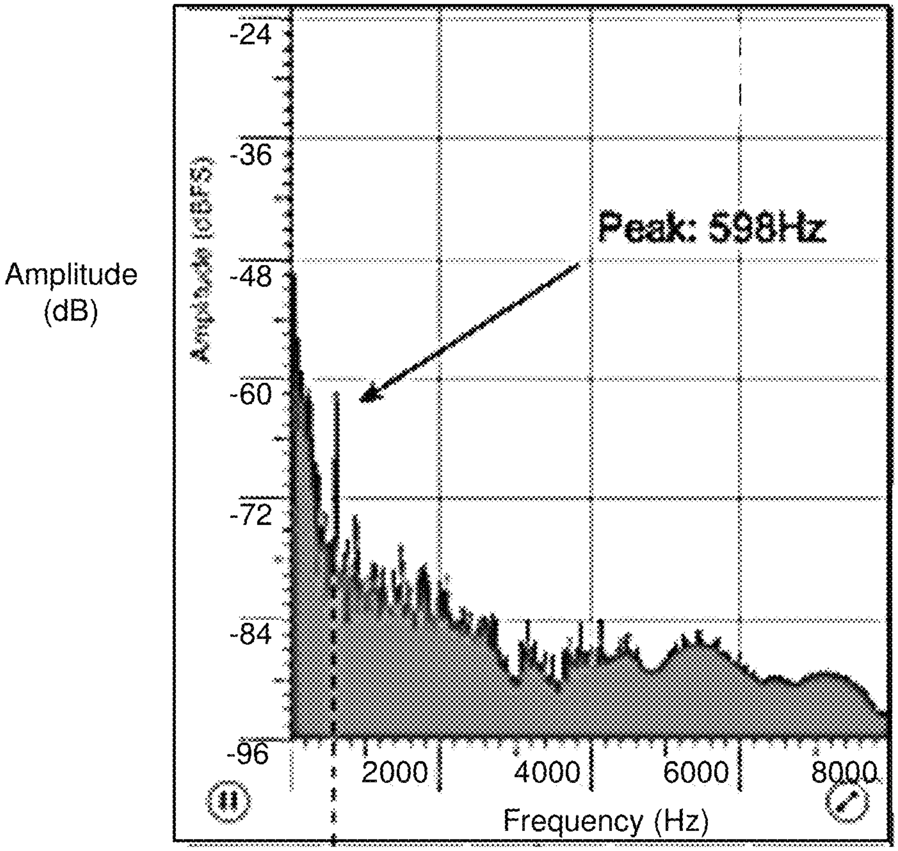
FIGS. 4A and 4B are graphical representations of an example measurement result of a sound spectrum emanating from a server measured from of and inside a server's room, respectively, in accordance with various embodiments and implementations of the subject disclosure.
Figure 4B:
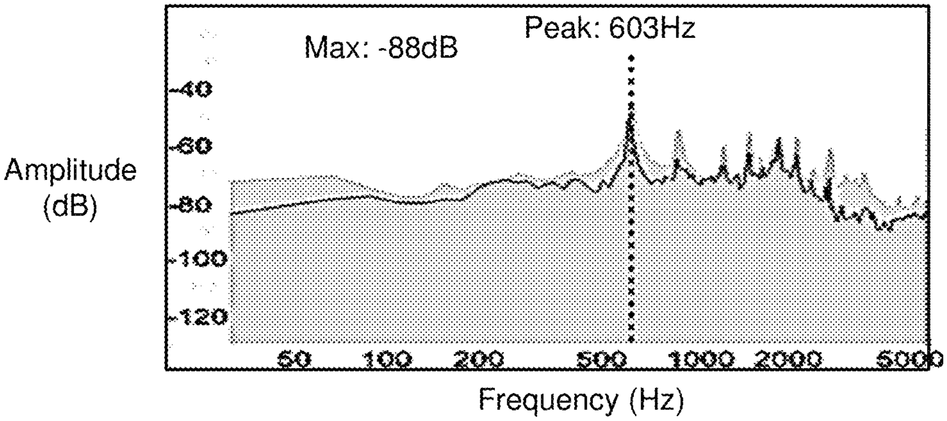

FIGS. 3, 4A and 4B show results of the noise characterization using acoustic sensor at different distances. Depending on the distance, the noise profile showed similar dominant peaks but different secondary peaks. More particularly, validation of single-frequency sound absorption via the above-described metasurface structure, which was designed to be effective within multiple narrowband frequency ranges or a broadband frequency range, was performed experimentally. Measurements were performed using an actual server with a metasurface positioned proximate to the server, including being measured within the same room as the server and measured outside the room. The measurements, depicted in FIGS. 3, 4A and 4B, indicate the primary noise frequency as around 600 Hz. Notably, when measuring within the same room, a secondary noise frequency at 2000 Hz emerges. This observation emphasizes the value of a multiple frequency sound-absorbing metamaterial, which can attain high absorption rates (greater than seventy-five percent) precisely at these designated frequencies, underscoring the metasurface's effectiveness in mitigating noise in such server application scenarios.

Figure 5:
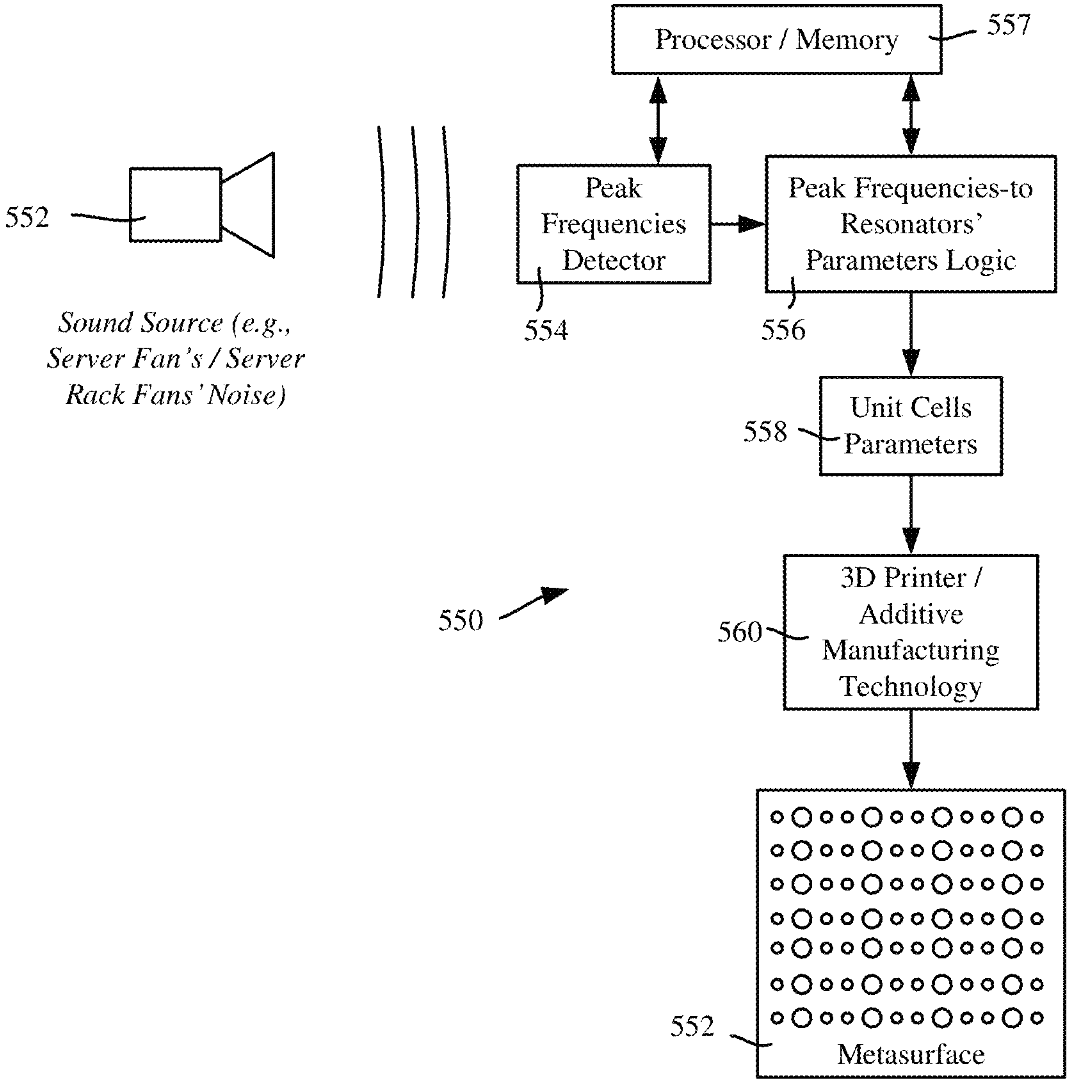
FIG. 5 is a block diagram showing an example system for implementing a metasurface with resonating unit cells for noise cancellation by phase canceling two or more narrowband frequencies in acoustic waves, in accordance with various embodiments and implementations of the subject disclosure.

FIG. 5 shows a generalized block diagram of an example system 550 including a sound source 552 such as server fan/fans of a rack of servers that generate undesirable noise including at two or more frequencies that are to be absorbed based on the technology described herein. A frequency measurement tool (e.g., FIG. 1) can be used as a peak frequency detector 554 or the like to determine which frequencies to cancel as described herein. As will be seen, the frequencies are absorbed extremely efficiently by the technology described herein, including each of the frequencies within a narrow band of nearby frequencies that are also reduced to a lesser, but still desirable, extent.

In general, Helmholtz resonators operate as a compact, highly efficient sound absorption solution when compared to other alternatives; however, a limitation of a Helmholtz resonator is its narrow-band frequency response. To address this narrow-band constraint, described herein is designing and implementing a super-cell concept in the form of a metasurface for sound absorption. By utilizing a rectangular grid arrangement of super-cells, each housing sub-cells (subgroups of unit cells) with distinct resonating frequencies, multifrequency sound absorption and/or broadband sound absorption can be achieved.

Returning to FIG. 5, once the frequencies to cancel are determined, e.g., the peak frequencies, peak frequencies-to-resonators' parameter logic 556 (e.g., the metasurface designer program 220 of FIG. 2 executing in a processor/memory 557), can be used to determine the parameters 558 of unit cells that can inverse phase cancel each of those frequencies. In one or more example implementations, a 3D printer/additive manufacturing technology 560 can be used to construct the unit cells based on the parameters, e.g., forming a metasurface 562, such as by omitting printing where the chambers and neck ports of the unit cells are located.

The unit cells 550 can be based on the principles of Helmholtz resonators, which are acoustic cavities with a small neck port or opening that are highly effective at absorbing specific frequencies via resonance. For example, the resonant frequency ($f_0$) of a classical Helmholtz resonator is denoted by:

$$f_0 = \frac{c}{2\pi}\sqrt{\frac{S}{L_p V}}$$

where, c is the speed of sound in the medium interested, S is the neck cross-sectional area, $L_p = l_{neck} + 1.7 r_{neck}$ is the length of the neck assuming cylinder shape, ($r_{neck}$ is the radius of the neck), and V is the volume of the cavity. Setting the resonance frequencies to the narrow-band noise frequencies, the parameters of the resonator can be computed using the above mentioned equation.

This resonance occurs because within the cavity, the sound waves bounce back and forth, with the neck acting as a spring, allowing air to flow in and out. When the frequency of the incoming sound matches the natural resonant frequency of the cavity, a substantial increase in energy absorption takes place. This energy absorption results in a significant reduction of sound at the resonant frequency.

Figure 6:
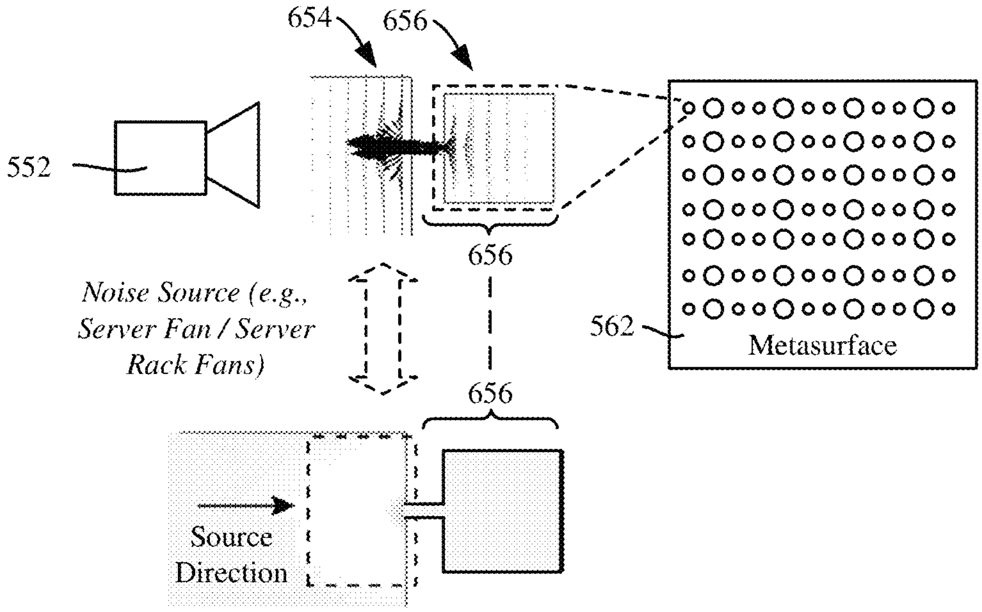
FIG. 6 is a representation of an example metasurface deployed for noise cancellation, in accordance with various embodiments and implementations of the subject disclosure.

The unit cells, each represented as a small circle in FIGS. 5 and 6, are incorporated into the metasurface 562, which can then be positioned to cancel the noise source at the determined frequency. In one implementation, the metasurface 562 contains an array of the unit cell resonator units arranged in one two-dimensional pattern interleaved with the unit cells of one or more other two-dimensional patterns. For absorbing a server's fan noise, for example, the metasurface 562 can be positioned proximate to the server's location, or even wrapped around at least part of the server's housing. The same metasurface noise-cancellation concept can be extended to a rack of servers via appropriately-sized (e.g., larger) and/or more metasurfaces.

As generally represented in FIG. 6, when incident sound waves (block 654) interact with the metasurface 562, the Helmholtz resonators within the array selectively absorb the corresponding frequencies via inverse phase cancellation; absorption of one such frequency is represented by vectors in blocks 654 and 656). As sound waves enter the resonators (e.g., the resonator 658) through its neck port, the sound waves create pressure fluctuations within the cavities. By engineering the geometrical parameters of the cavity/air chamber, the resulting resonance frequency of the unit cell creates a π phase shift reflected wave with respect to the incident waves as shown in FIG. 6, where the two sets of waves with opposite phase cancel, effectively absorbing the frequency (of one of the multiple frequencies to be absorbed). This is highlighted via the air velocity vector plot showing the direction of the reflected wave with π phase shift in the upper portion of FIG. 6. In addition, these pressure fluctuations also cause the air inside the cavities to oscillate, effectively converting acoustic energy into kinetic energy. This kinetic energy is then dissipated as heat through viscous losses in the narrow neck of the resonators, however the heat dissipation is appreciably better relative to traditional sound absorbers and does not significantly affect thermal performance of a server.

Figure 7:
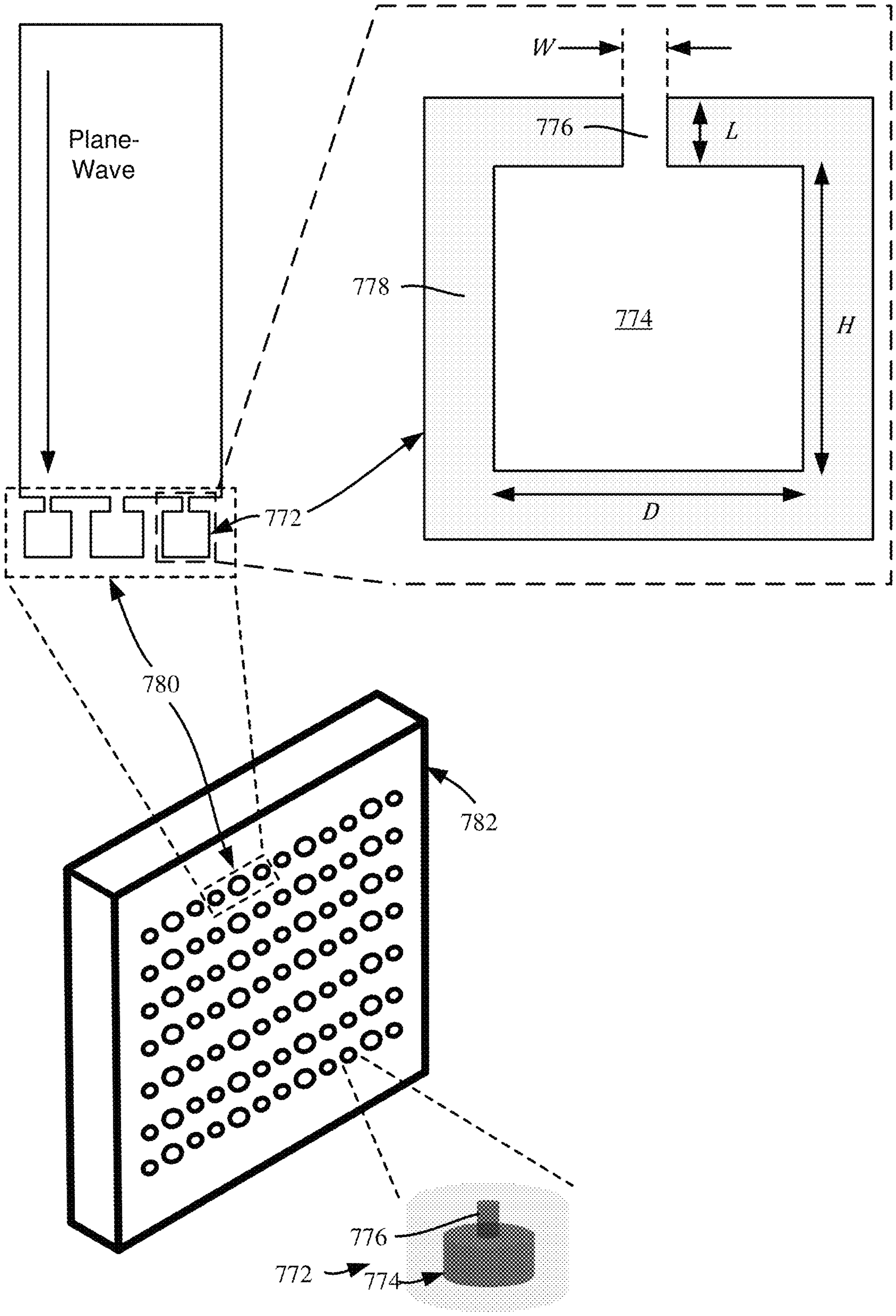
FIG. 7 includes a two-dimensional side view representation of example unit-cells, including one enlarged representation of a unit cell showing various dimensions that determine the unit cell's resonance frequency, and three unit cells forming different Helmholtz resonators for absorbing three different acoustic frequencies, in accordance with various embodiments and implementations of the subject disclosure.

As generally represented in FIG. 7, each unit cell (e.g., 772) comprises a cavity, or air chamber 774, often with a neck port 776 that exposes the air chamber to the air/incoming sound waves, with dimensions engineered to target a particular frequency or a narrowband range of frequencies of interest. The dimensions of the air chamber 774 and neck port 776 are designed based on the desired acoustic frequencies, allowing the unit cells of the metasurface 772 to resonate when exposed to sound waves of those frequencies. When constructed, the air chamber 774 and neck port 776, which are hollow to contain air, are enclosed in a supporting structure 778 through which the neck port 776 extends to couple the chamber to the air propagating the sound wave.

FIG. 7 also illustrates the unit cell's variable dimensions including the chamber height (H), and in the example of a cylindrical air chamber, the chamber's diameter (D) which is twice the radius, such that a cylindrical air chamber's volume is:

$$V = \left(\pi \times \frac{1}{2} D\right)^2 \times H.$$

The neck port, which is also a cylindrical tube in this example, has an area of $$\left(\pi \times \frac{1}{2} W\right)^2$$

and a length of L. A unit cell is not limited to cylindrical air chambers or cylindrical necks, but can be of any suitable shape that facilitates resonating at the desired frequency in a manner that phase cancels the incoming sound wave of that frequency.

The result is highly efficient sound absorption at specific frequencies. By designing multiple unit cell resonators (block 780) as shown in FIG. 7, the metasurface 782 is particularly useful for targeted noise reduction in environments where controlling specific frequencies is beneficial, such as in architectural acoustics, automotive design, and industrial settings. The dimensions are deep subwavelength values relative to the subwavelength of the incoming wave. For example, one unit cell implementation was designed to inverse phase cancel an incoming frequency of 1310 Hz, with selected unit-cell dimensions of D=18 mm, H=16 mm, L=6 mm, W=3.2 mm. The resulting absorption coefficient of the designed unit-cell achieved near-perfect (greater than 98 percent absorption at the designed frequency 1310 Hz). Such a structure is deeply sub-wavelength; the wavelength A at 1310 Hz in air is 260 mm, which is controlled by unit-cell with thickness of 22 mm. As can be seen, the above-selected dimensions of D, H, L and W for 1310 hertz (λ=260 m) in air range from about λ/14 to λ/81 (or λ/13 if based on the thickness of 22 mm).

Figure 8:
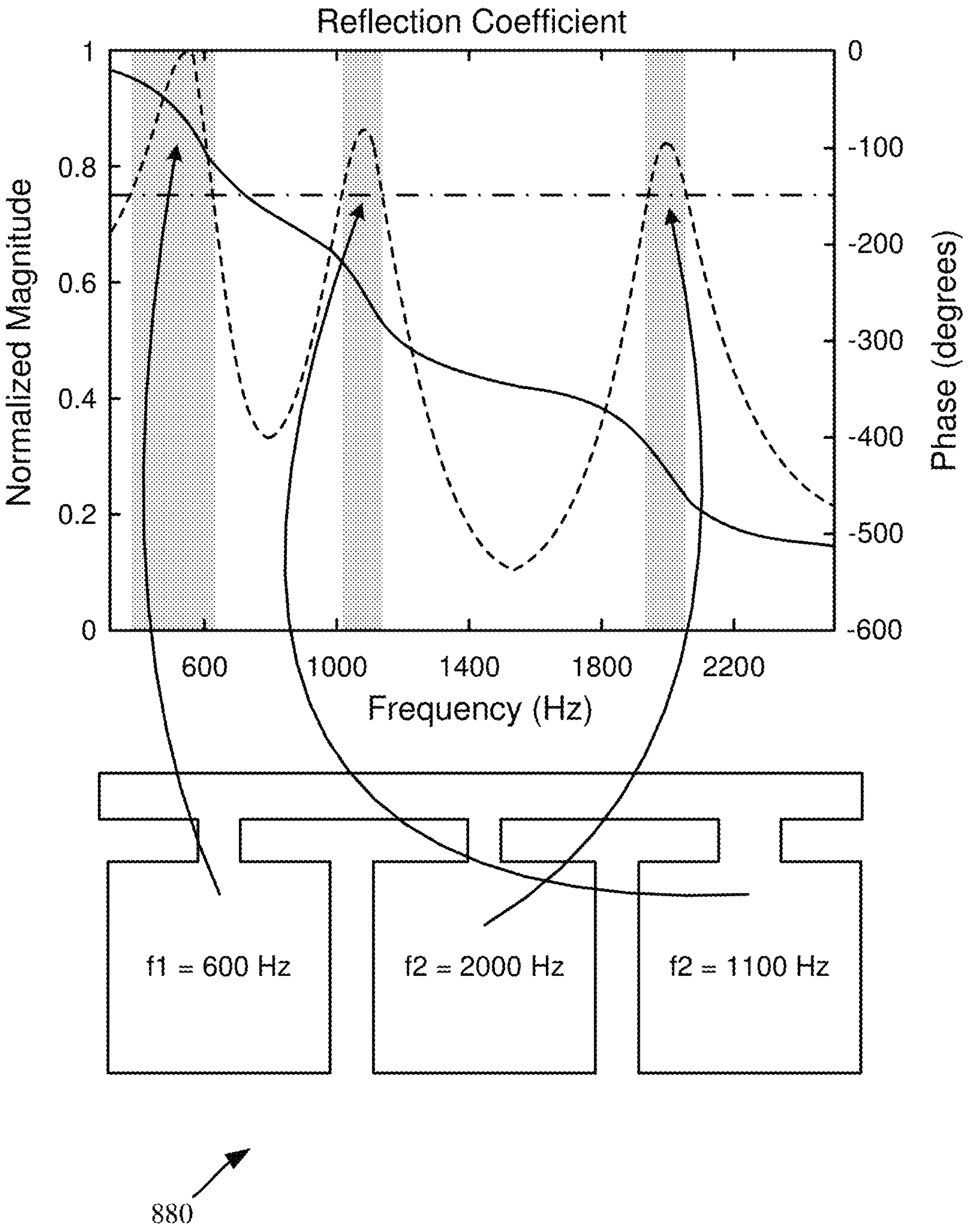
FIG. 8 is a graphical representation of resulting absorption coefficient values of the three unit cells of FIG. 7, indicating three very high reflection coefficient values for three different frequencies resulting in multiband frequency absorption, in accordance with various embodiments and implementations of the subject disclosure.

FIG. 8 shows the concept of a metasurface of a partial group of unit cells 880 designed for noise canceling three distinct frequencies, that is, the metasurface is designed for multiband noise cancelation. As depicted in FIGS. 7 and 8, an illustrative example of a tri-band sound absorption metamaterial results from the geometry of the structure, designed using the equations described herein for Helmholtz resonators that target three discrete frequencies. The effectiveness of the design can be verified by plotting the reflection coefficient of the proposed structure across the frequency spectrum, as shown in FIG. 8. The gray areas in the plot highlight regions of high absorption, exceeding seventy-five percent at the three intended frequencies.

A metasurface structure can be extended to encompass additional frequency bands. However, this extension comes at the expense of reduced absorption as the frequency bands widen. This phenomenon is also discernible in the plot of FIG. 8, where the lowest frequency exhibits nearly perfect absorption (greater than ninety-eight percent), while the highest frequency achieves a still highly beneficial absorption rate of around eighty percent.

Figure 9:
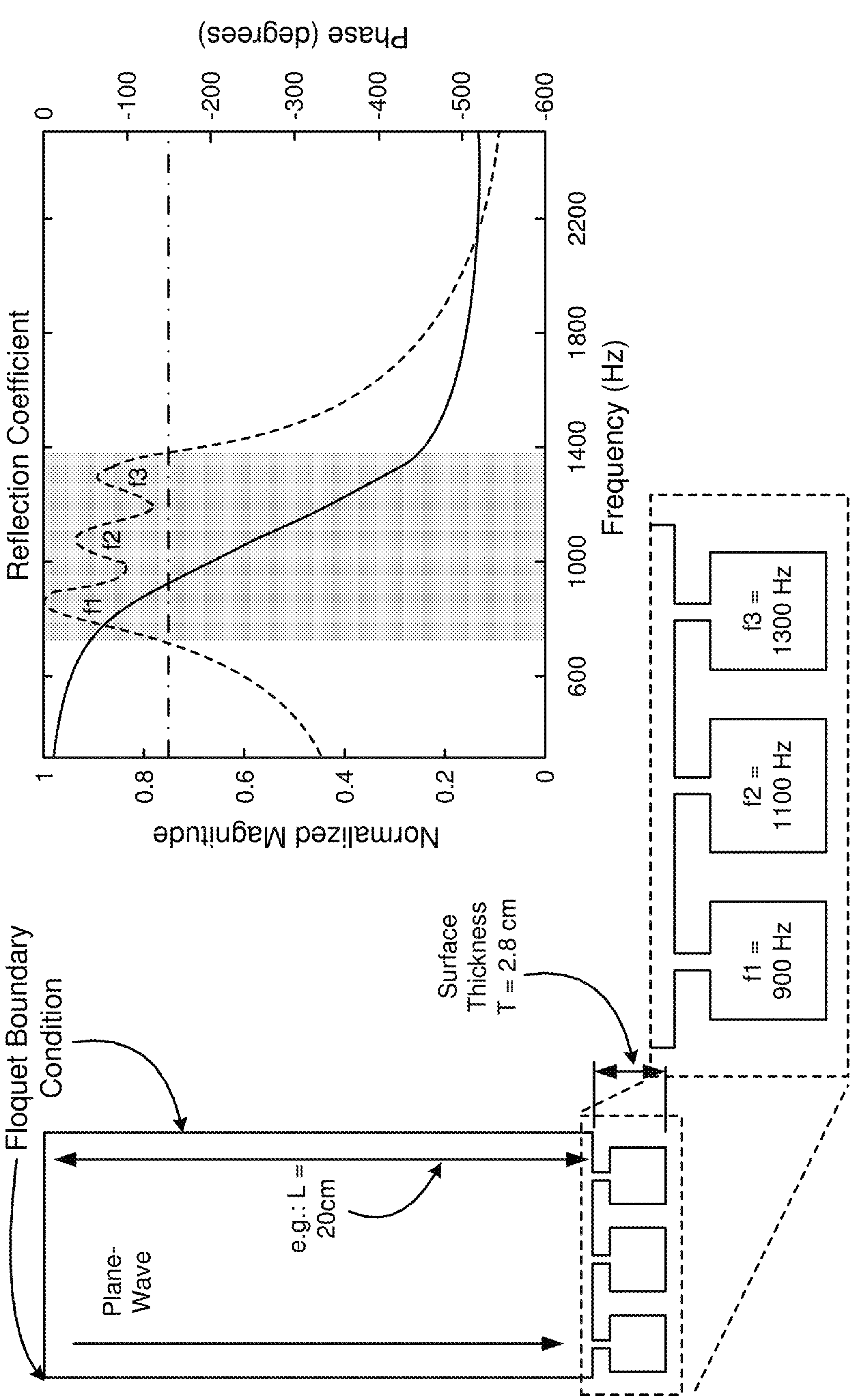
FIG. 9 is a graphical representation of resulting absorption coefficient values of three other unit-cells (relative to FIG. 8), showing three very high reflection coefficient values for three different frequencies, resulting in broadband frequency absorption, in accordance with various embodiments and implementations of the subject disclosure.

As noted herein, one prominent limitation of Helmholtz resonators, in contrast to other existing methods, is their narrowband nature. This limitation is ameliorated by organizing sub-cells with resonant frequencies in close proximity to each other. Such an arrangement broadens the resonant frequency within the super-cell and the overall structure. As depicted in FIG. 9, this sub-cell approach yields high absorption rates (greater than seventy-five percent), spanning a broadband range from about 750 Hz to 1400 Hz, based on a pattern of three interleaving resonators designed for absorbing relatively close frequencies of 900 Hz, 1100 Hz and 1100 Hz. Note that a single metasurface can be designed for both broadband and multiband frequency absorption, and/or different multiple metasurfaces can be deployed.

The designed unit-cell only needs air and its surrounding acoustic hard boundaries. This is different from other approaches using porous and fibrous materials and gradient index materials. At this scale the unit-cell acts almost like a point towards the wave, so this design is not straightforward. However, the materials and the compact design in mm-scale/deeply sub-wavelength facilitate fabricating the unit cell as a thin, light-weight, and cost effective absorber with 3D printing technology.

The sound absorbing unit-cell can be fabricated using 3D printing technology with the features of material simplicity and deeply sub-wavelength compact design. One such metasurface was implemented with a 4 cm thickness and a 40 cm by 40 cm width and length. Note that while a symmetrical array of interleaved patterns is one suitable example, this is only one non-limiting example. Further note that the entire metasurface can be 3D printed, with selectively different materials for the unit cell supporting structure compared to the remainder of the metasurface that houses the unit cells, including, for example, a high thermal conductivity material (such as aluminum nitrate) for at least part of the metasurface containing the arrangement of unit cells. In this way, the high thermal conductivity material better transfers the heat away from the server or the like for dissipation in the surrounding environment, e.g., the air of a room. If only the unit cell portions are 3D printed, the non-unit cell part of the metasurface can be machined to accept and contain the separately printed or otherwise constructed unit cells, e.g., one subsurface with openings appropriately-sized for the chamber dimensions, and another subsurface with openings appropriately-sized for the neck dimensions, which when joined form the metasurface.

The entire structure can have a significantly reduced weight and material cost compared to the other sound absorbing alternatives. For example, the air cavities of the unit cells occupy a reasonable percent of the space in the solid supporting structure. The 3D printing technology can use a grid structure for the solid part, with an average of a relatively low percent of material usage using a common cross-grid structure. Combining these two factors, the designed example structure contains a significant percentage of air, reducing overall weight and material usage.

In many instances, it is not practical or possible to test every device (which hereinafter will be described as an example server) with the array of microphones to capture an accurate sound signature of each individual server model. For example, a slight change in the hardware, such as an upgraded CPU with higher clock speed, may need a slightly different heatsink and fan compared to one or two previous iterations of the server product, which can potentially change the dominant noise peak, yet testing each such modified model consumes time and resources and thus may not be performed. Similarly, a customer or the like may request a metasurface to cancel noise of a device that the customer possesses, but is not readily available to test.

Thus, instead of characterizing each of the devices by actual noise testing, as a small change in the hardware can slightly shift the dominant noise peak, a machine learning-based automated design process can be used to design metasurfaces based on training data. Once trained, a machine learning model (e.g., a neural network such as a convolutional neural network) provided with suitable input outputs a metasurface design for the first dominant peak, and possibly other subsequent noise peaks, e.g., if they meet a defined noise-level threshold.

Figure 10:
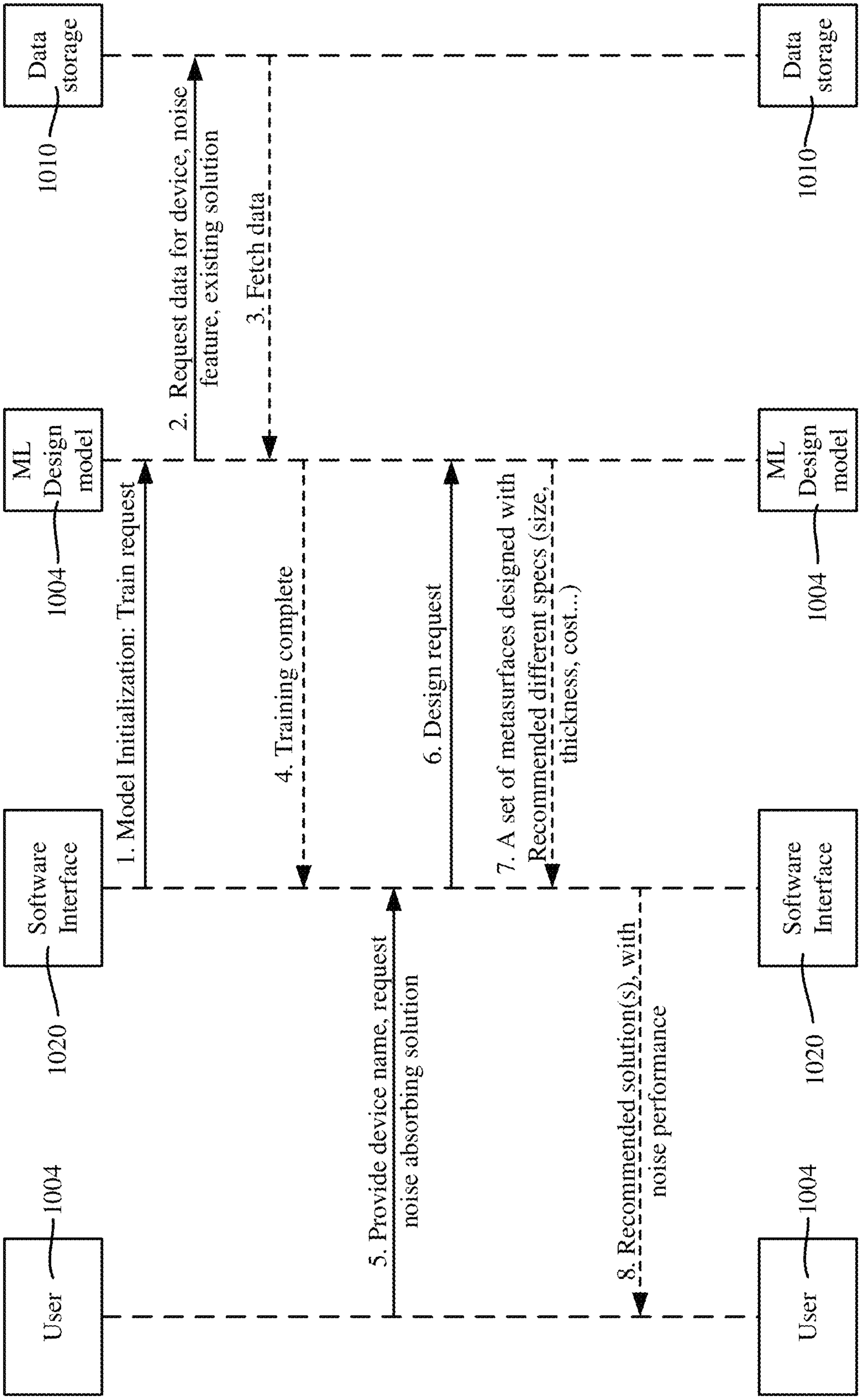
FIG. 10 is a sequence diagram for an example feature recommendation process using automated acoustic surface design for different noise characteristics based on machine learning, in accordance with various embodiments and implementations of the subject disclosure.

FIG. 10 shows an example feature recommendation process using such an automated acoustic surface design for different noise characteristics based on machine learning, in which model initialization begins with a train request (arrow (1)). Arrow (2) requests the training data from the data storage 1010, e.g., as populated via testing servers as described herein with reference to FIGS. 1 and 2, which is returned via arrow (3). In general, training is based on learning the relationships between device feature data and the noise profile data; for example, a server with device features including a certain type of fan with a certain type of heatsink and so on is related to a certain noise profile.

Thus, the measurement process has taken place for a number of servers as described herein with reference to FIGS. 1 and 2, followed by the training request by the metasurface design software via its software interface 1020. As in FIG. 2, the model designer program 220 starts scanning the existing database 210 to determine whether a solution is available to suppress certain peaks, and uses that solution if located. If not, the software interface 1020 uses an approximation, and provides an initial recommended solution with certain confidence level. For example, consider that a technician has measured the sound profile of the server having a certain configuration. The compute platform requests and obtains specific information (device feature data) for the device-under-test, in this example a server, including but not limited to type of processor, number of memory sticks, general processing unit (GPU) make and model, number of GPUs, additional expansion (e.g., PCIe) cards, heatsink model, number of cooling fans, make and model of cooling fans, max speed (RPM) of the fans, chassis type, bezel type (solid or vented), and so on.

Based on the measurements of various servers, the ML design model 1004 (FIG. 10) starts relating the metasurface unit cell design including specifications such as neck width, neck diameter, material required, thickness and so on of the resonators with the server feature data collected as part of the testing. In general, the training conclusively learns common relations, such as a certain neck profile of a resonator can be used to suppress certain noise peak which is common among a set of hardware features. A higher number of tests will make the design process more accurate because of the database addition and finding similarities of the noise peaks with specific set of hardware modules.

Once trained (arrow (4)), the model 1020 can quickly provide metasurface design parameters based on the server's hardware features, without requiring any full-wave simulations. When a user provides a device name/identifier to the software interface 1020 (arrow (5)) of the model designer program, (and the device is not found in the data storage 1010), the server's hardware feature data typically can be obtained from its published specifications. This can be performed by the software interface 1020 and provided as part of the design request (arrow (6)), or the ML design model (or another program) can locate the specifications based on the device name/identifier. In the event the specifications are incomplete, or the user 1004 knows of a custom change not within the specifications, the user 1004 can provide the missing and/or modified feature data, which can be included in the design request.

Based on the server's hardware feature data, the ML design model estimates noise profile data/noise frequency peaks for the server, and returns a set of one or more metasurfaces designed with recommended different specifications, such as neck port and chamber sizes, thickness, cost and any other useful information for metasurface(s) that are able to suppress the estimated noise peaks profile data for that server. A confidence level can be returned in association with each metasurface's design parameters. Based on this information, one or more recommended solutions are returned to the user (arrow (8), in response to the request (arrow (5)).

Figure 11:
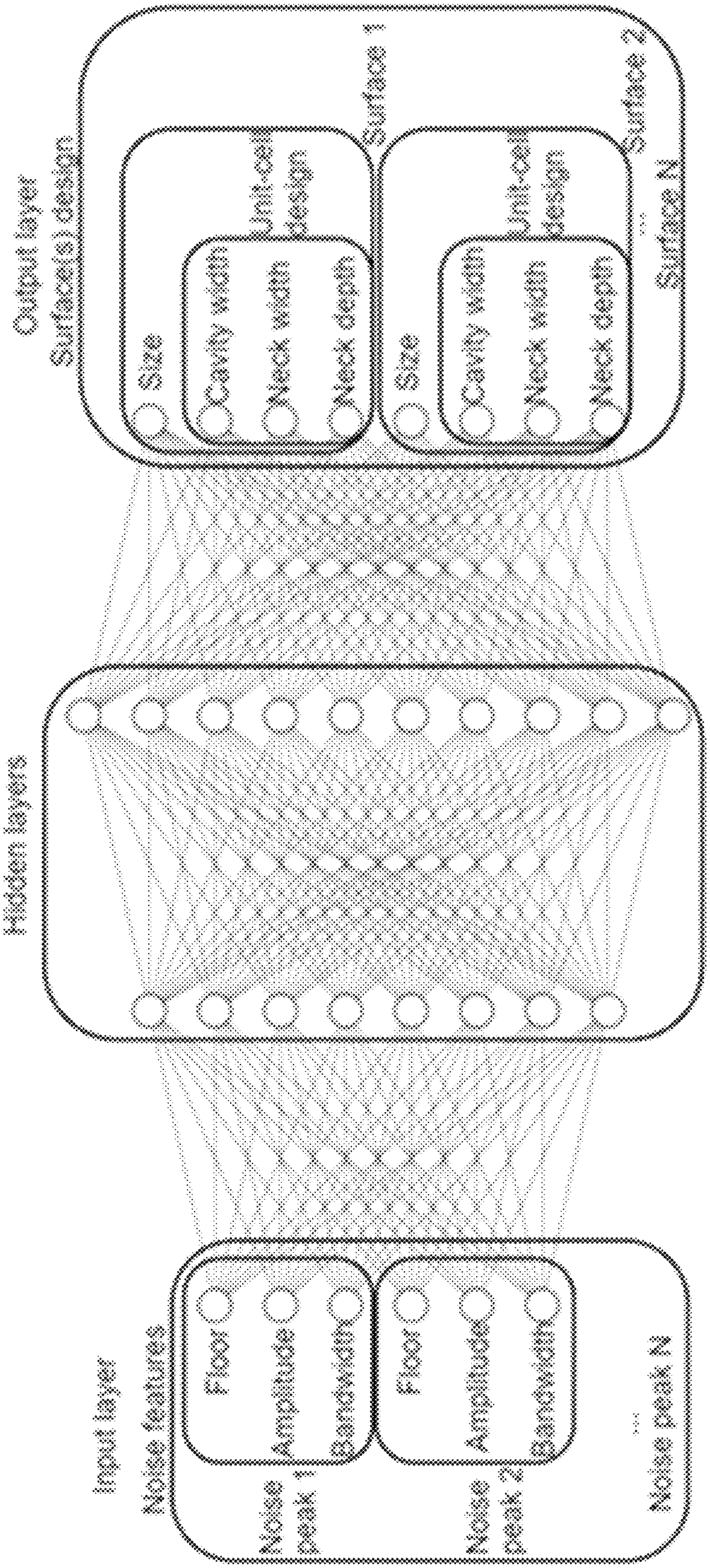
FIG. 11 is a representation of an example neural network that processes noise peak input feature data into unit cell parameters for one or more metasurfaces, in accordance with various embodiments and implementations of the subject disclosure.

Note that the input and output data can be converted to a machine learning-friendly format. Note that many ML approaches are suitable for making the estimation and thus are not described in detail herein; notwithstanding the design variables remain consistent across such models. Indeed, as shown in FIG. 11, which is directed to converting input and output data to ML-friendly format for noise absorption, numerical features are selected on the dataset for implementing machine learning-based automated design. The noise spectrum can include hundreds or thousands of data points that are converted to features, e.g., floor, amplitude and bandwidth, based on the noise peak data. This significantly reduces the computational load.

The concepts of surface design, shown as the output from the model, are also represented by numerical design parameters. Note that although parameters including size, cavity width, neck width and neck volume are shown in this example for separate metasurfaces corresponding to separate unit cells, sets of unit cell parameters for a single metasurface (e.g., as described herein with reference to FIGS. 5-9) incorporating the differently-dimensioned unit cells for different noise peaks can be output by the model. The model can output the interleave pattern of the different unit cells, and the number of unit cells in the pattern for different noise peaks need not be the same, e.g., a large amplitude frequency can have more unit cells for canceling that larger peak versus a lesser number of unit cells for a smaller amplitude frequency peak (but still with a sufficient noise level to recommend canceling), and so on. For a metasurface with a sufficiently high confidence level, and/or if evaluations of a deployed metasurface indicate that the metasurface is highly effective in suppressing device noise for the intended device, the estimated noise profile data can be maintained in the data store in association with the device feature data for use in subsequent predictions.

Figure 12:
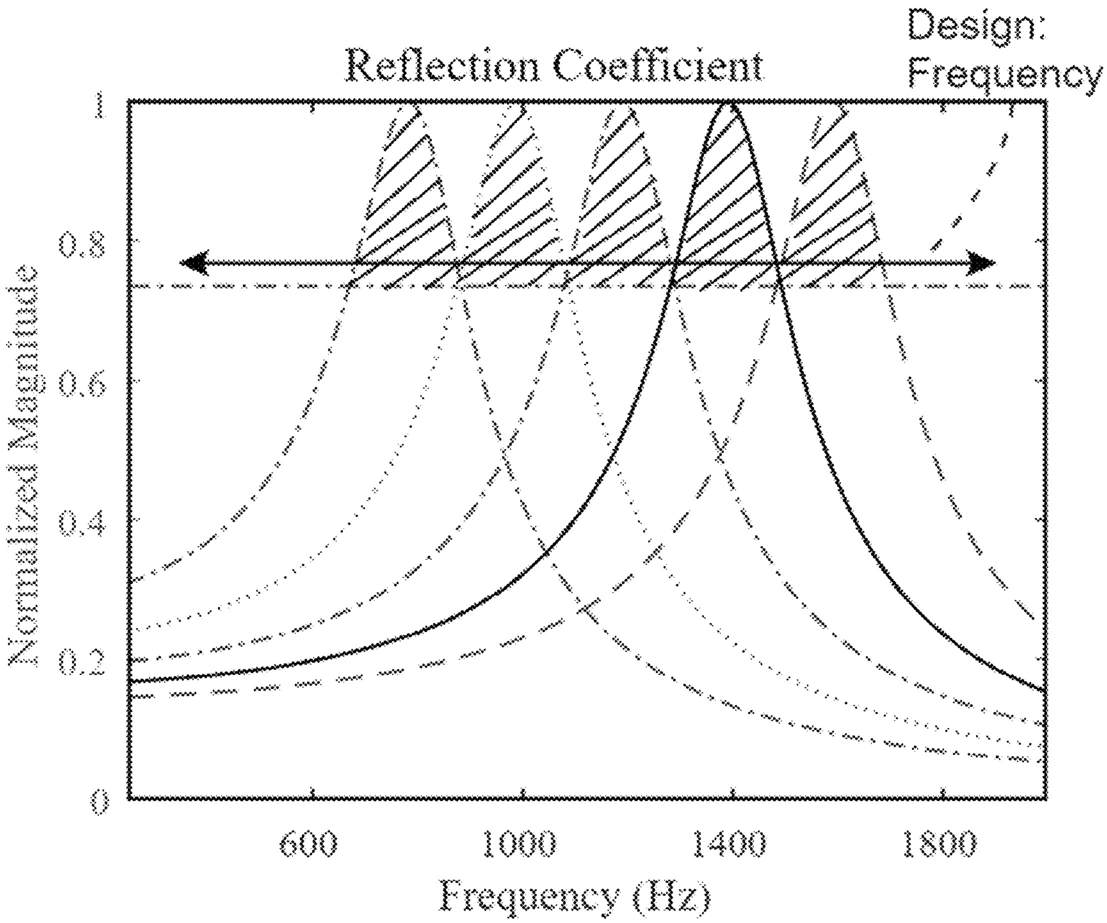
FIGS. 12 and 13 are graphical representations showing simulated reflection coefficient data with respect to adjusting resonator cell geometrical parameters, in accordance with various embodiments and implementations of the subject disclosure.
Figure 13:
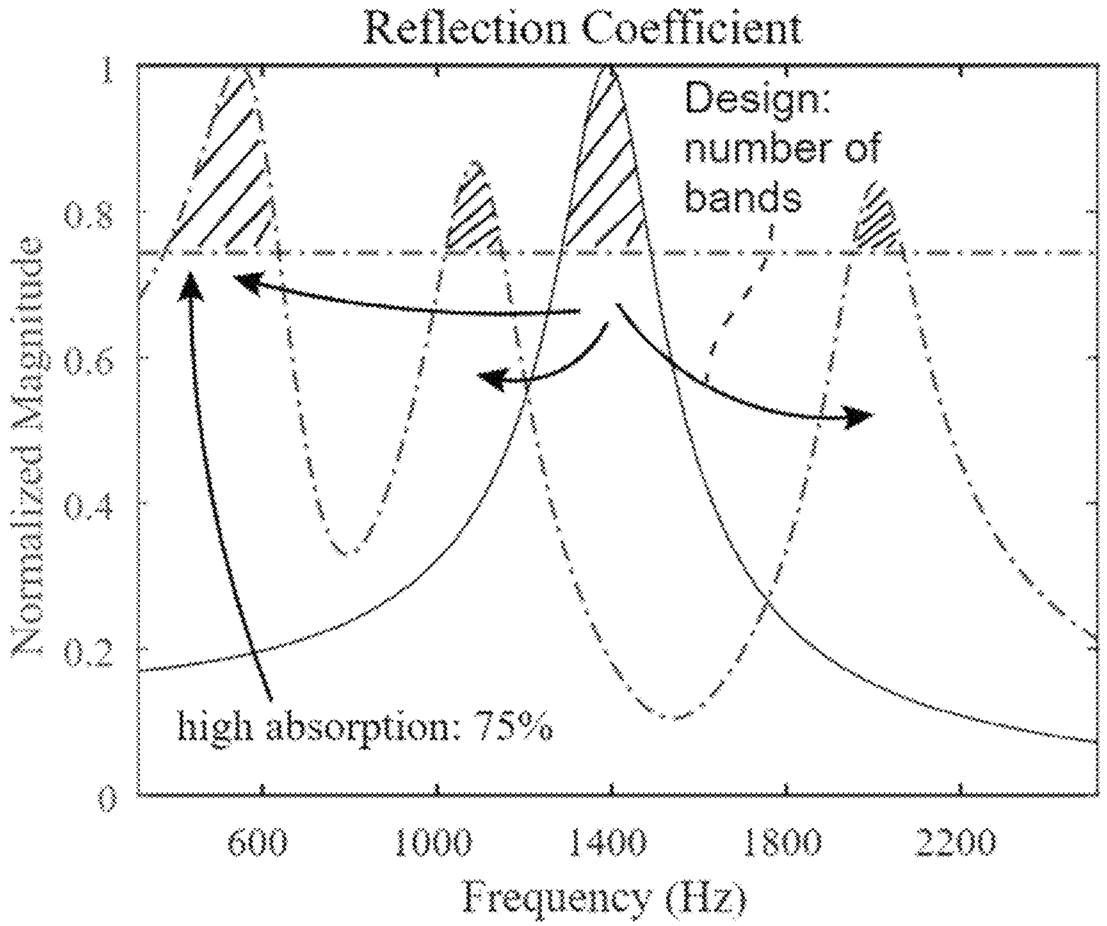

By way of example, FIGS. 12 and 13 show simulated reflection coefficient data. The data show changes resulting from different geometrical parameters of resonator cells.

Turning to another concept, in addition to suppressing the noise of individual servers, described is an acoustic metasurface design recommendation process for suppressing noise in a server rack having a combination of multiple units (devices). Typically, a server infrastructure rack (6U-42U height, where "U" represents a unit) usually have multiple units installed therein, including but not limited to compute server (1U-8U height), storage arrays, uninterrupted power supplies, network/communication switches, and so on. If a foam-based solution is used, a one fit for all can be used to suppress the combined noise, because of the broadband nature of the foam. However, foam causes thermal throttling and increases the surrounding temperature a significant amount. Moreover, foam is not a viable solution for larger racks such as for standard 42U height racks.

In contrast, metasurface-based noise suppression does not have such significant thermal problems, however metasurface-based noise suppression is not a universal one-size-fit-all approach. As such, metasurface design needs to be customized to suppress individual noise peaks as described herein.

Based on the training data as described with reference to FIGS. 10-13, the design process to suppress individual peaks can be used. However, it is a challenge to design metasurfaces for server racks with various different units installed. More particularly, while a device manufacturer likely can design add-on metasurfaces for its own products, it becomes challenging to design metasurfaces for vendor products that are not fully characterized.

Described herein is a machine learning-based design recommendation process for a server rack with multiple, different units installed. This design recommendation process addresses the issue of a user that has list of server/device units, does not know how to design an acoustic metasurface, yet wants a noise suppression solution tailored to the user's need.

To this end, an automated process for designing noise suppressing metasurfaces based on a choice of hardware features, is obtained via a machine learning based-prediction and optimization solution. The design process facilitates recommendation of an overall metasurface design. Again, various ML models can be used, e.g., any neural network-based model such as a convolution neural network or a deep reinforcement learning-based model can be used to map and train such input features to an output layer that includes the number of frequency points to suppress.

Further, the technology can be based on a noise spectrum prediction model for individual hardware features, in the form of numerical and categorical features. Non-limiting examples of numerical features include fan speed, CPU speed, total power consumption, unit dimensions and the like, which are generally published values. Nonlimiting examples of categorical features include fan type, cooling option, bezel style and the like.

Figure 14:
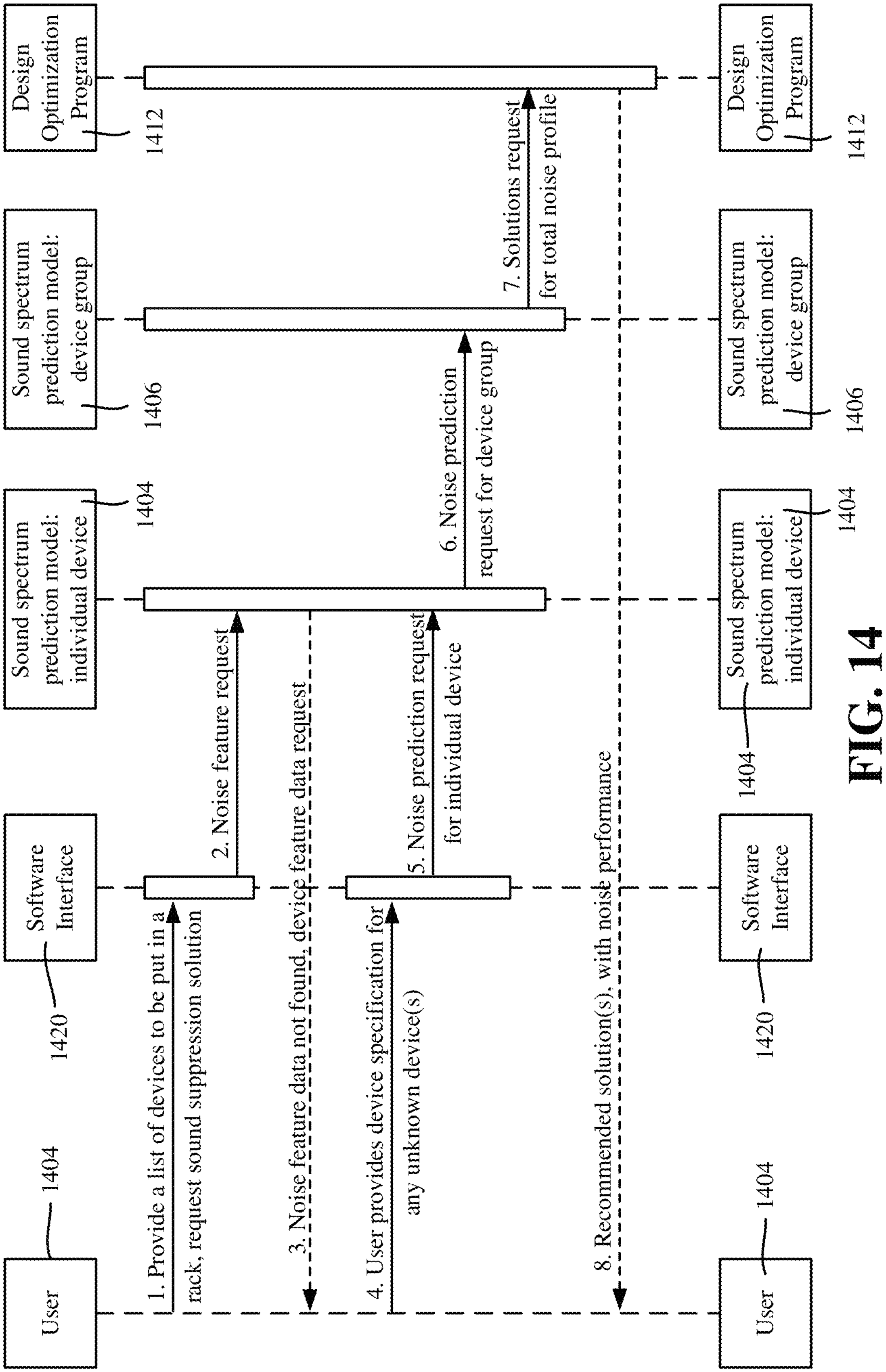
FIG. 14 is sequence diagram of an example process for a soundproof recommendation for a group of devices in a server rack, in accordance with various embodiments and implementations of the subject disclosure.
Figure 15:
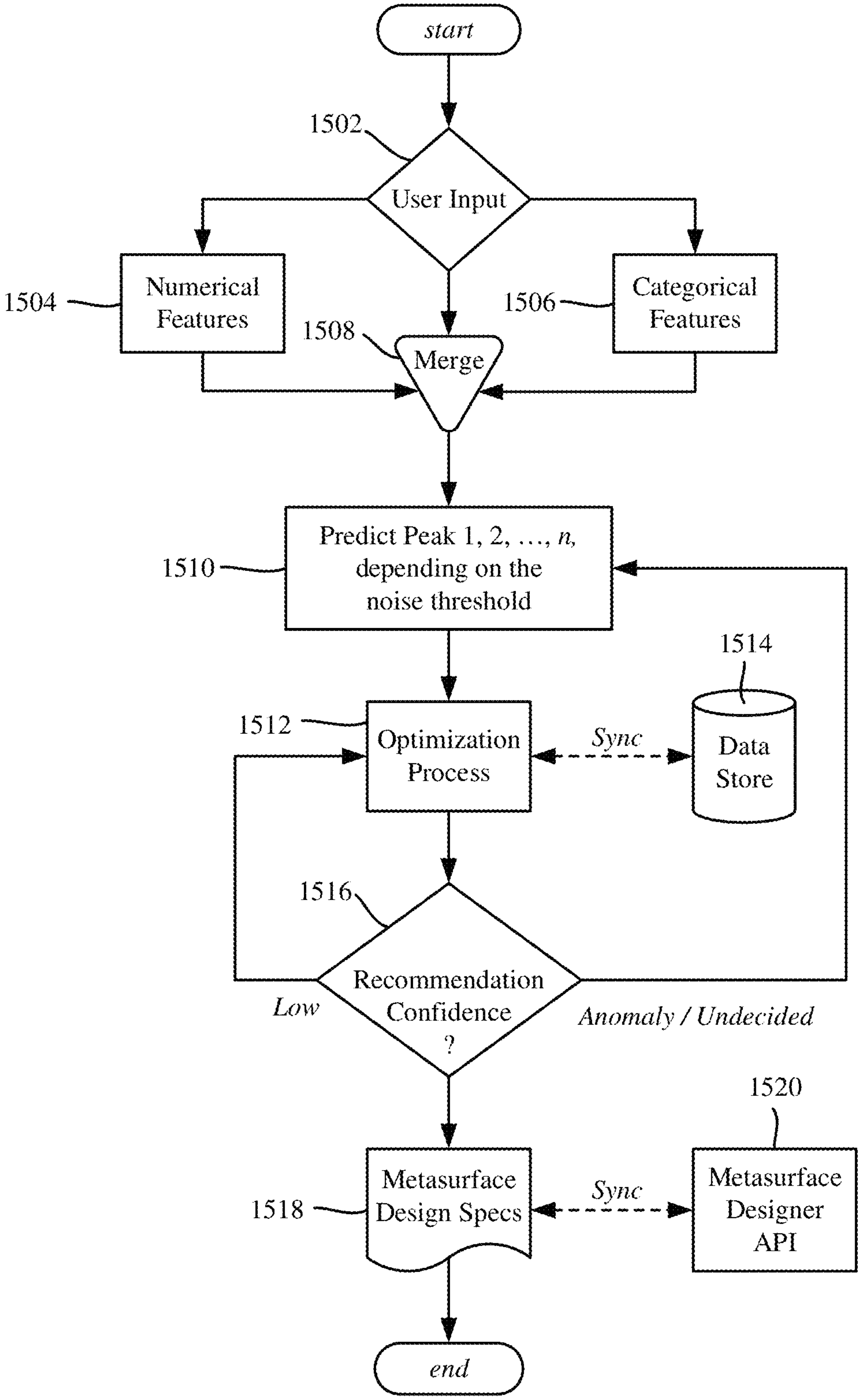
FIG. 15 is a flow diagram showing example operations and components related to predicting noise peak data for designing a metasurface for suppressing noise emanating from a group of devices in a server rack, in accordance with various embodiments and implementations of the subject disclosure.

FIGS. 14 and 15 show a sequence diagram of an example process for a sound suppression recommendation, and a process flow highlighting various operations/components of the process, respectively. As will be understood, FIGS. 14 and 15 describe a process of noise suppression recommendation, e.g. for a metasurface (or multiple metasurfaces) as an add-on component for server rack customization, based on a list of selected hardware.

As shown in FIG. 14, at arrow (1) a user 1004 provides, to a software interface 1420 (e.g., an interface of a metasurface designer program), a list of devices to be put in a rack as a group, and requests a sound suppression solution. Note that for better estimates of the metasurface unit cell parameters, the position/ordering of the devices in the rack is specified, along with the position of any gaps.

Arrow (2) represents a noise feature request from the software interface to a sound spectrum prediction model 1404 for an individual device, e.g., corresponding to or similar to the ML design model 1004 of FIG. 10. For any noise feature data not found by the individual device spectrum prediction model 1404, the individual device spectrum prediction model 1404 requests device feature data from the user 1404 (arrow (3)), which the user 1404 provides as device specification for any unknown device(s) at arrow (4). This corresponds to operation 1402 of FIG. 15, along with blocks 1504 and 1506, in which the user input provides numerical features and categorical features, respectively, which are merged at operation 1508.

Arrow (5) represents the software interface making a noise prediction request for each individual device to the individual device spectrum prediction model 1404. When the individual device predictions are made, the individual device spectrum prediction model 1404 sends the data to a device group sound spectrum prediction model 1406, as represented via arrow (6). The device group sound spectrum prediction model 1406 predicts the noise profile data for the group, and sends the predicted group noise profile data to a design optimization program as a solutions request arrow (7) for the total noise profile. Arrow (8) returns the recommended solution or solutions to the user 1404, with noise performance data.

Note that there can be many noise peaks, and thus as shown via operation 1510 of FIG. 15, only the noise peaks that satisfy a defined noise-level threshold are used in determining the design parameters for the metasurface. Operations 1510, iteratively works with the optimization process 1412 of FIG. 14 (block 1512 in FIG. 15), which accesses information in the data store until a sufficient recommendation confidence level is achieved with respect to the metasurface design specifications output by the device group model (block 1518). Once the metasurface design specifications are associated with a sufficient recommendation confidence, the metasurface designer API (block 1520 in FIG. 15) can design/print out the metasurface as described herein.

Numerical features are selected as on the data set for implementing machine learning-based noise profile prediction. The noise spectrum consists of hundreds or thousands of data point that are recreated from the device features related to sound performance. This significantly reduces computational load and the amount of storage needed.

Example hardware features for a server unit, using variations of the server, are shown in the table below:

| Hot-plug fan sets | Form factor | Power supply | Fan type | Cooling option | . . . |
|---|---|---|---|---|---|
| 0 | 1 | 1400 W | Standard | Air | . . . |
| 2 | 1 | 1800 W | High performance | Air | . . . |
| 0 | 1 | 1100 W | Standard | Optional Direct Liquid Cooling (DLC) | . . . |

Figure 16:
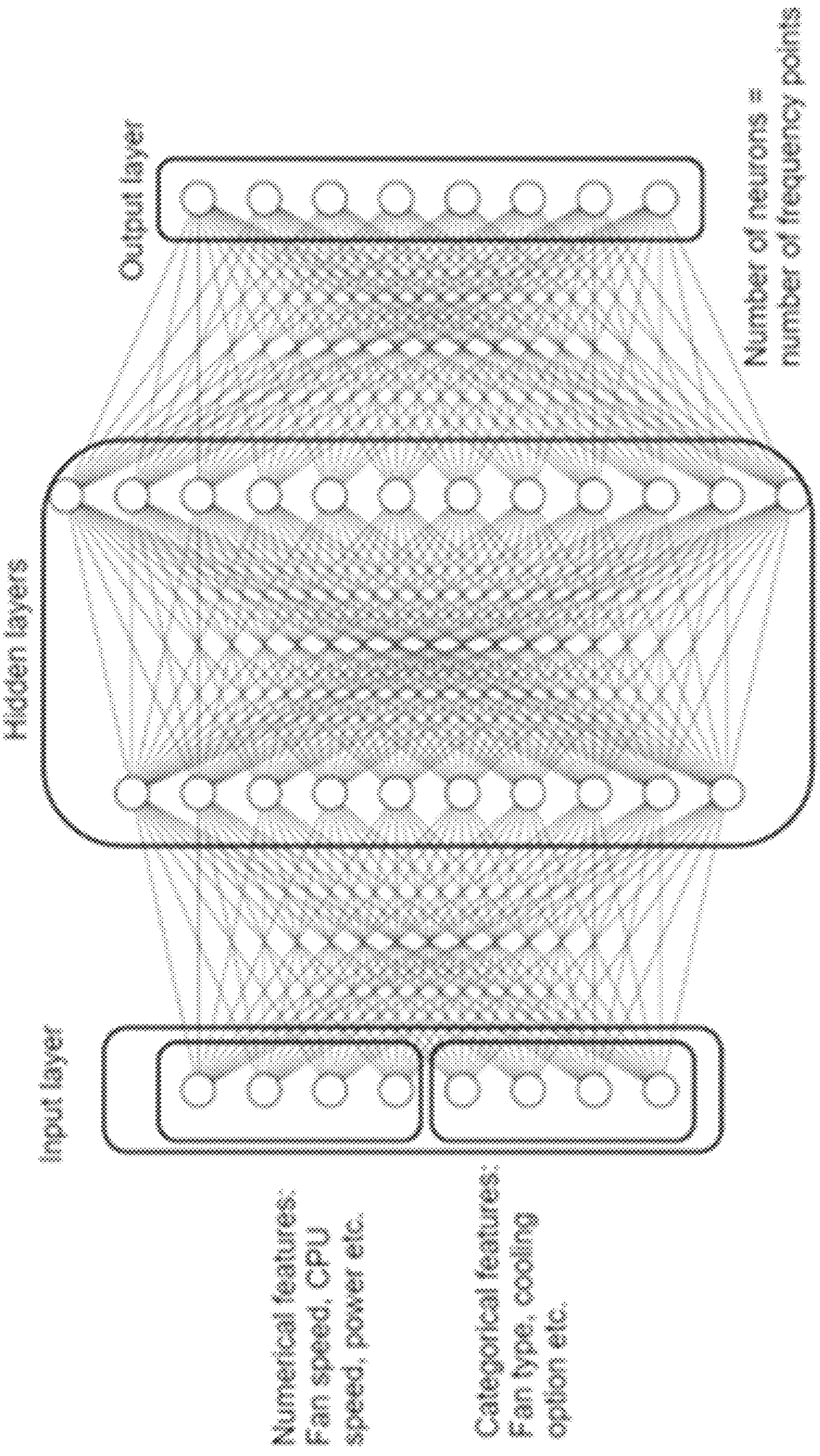
FIG. 16 is a representation of noise spectrum analysis based on an example neural network for hardware components, in accordance with various embodiments and implementations of the subject disclosure.

FIG. 16, directed to the noise spectrum analysis based on a neural network for hardware components, represents an example implementation, where the data set for input includes the numerical features and categorical features, and the output is the frequency peak data, which can be used to design the metasurface. As shown in FIGS. 14-16, the design process is an automated recommendation process based on the selected hardware. The process predicts the individual spectrum of the selected hardware device from one model of machine learning, then predicts the overall sound profile of the rack using another model of machine learning. Thereafter an optimization process produces a solution to achieve noise suppression.

Moreover, if a user does not know and/or cannot locate the needed specifications, the user can use a phone (with built-in microphone), or a dedicated microphone and a noise capture application to obtain the noise profile data for the devices deployed and operating in a server rack. A user can sweep the phone/microphone up and down in the front and back side of the rack, whereby the captured noise profile can be used to provide a solution. LIDAR or video can detect if the user is moving too fast, and an application program can guide the user how to move the phone/microphone to cover the total front area and the back area.

Figure 17:
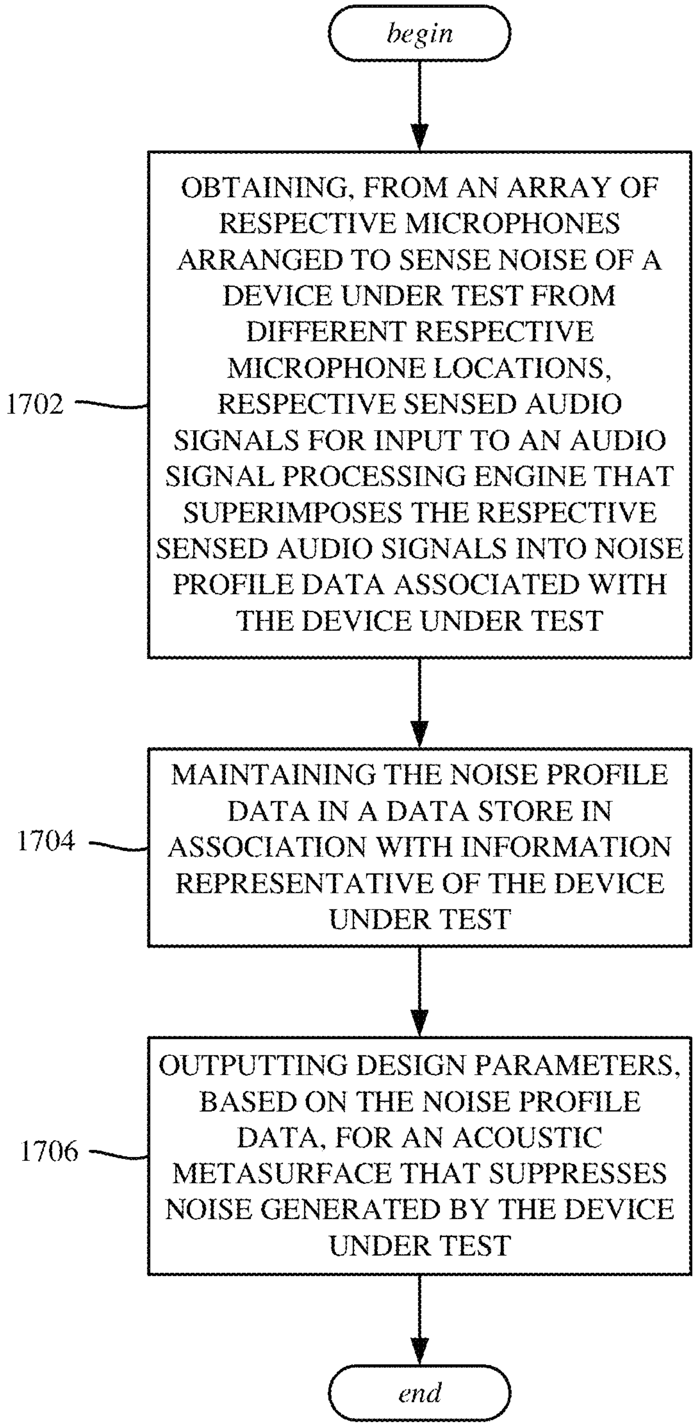
FIG. 17 is a flow diagram showing example operations related to obtaining sensed audio signals, corresponding to noise profile data, from an array of microphones for use in outputting acoustic metasurface design parameters, in accordance with various embodiments and implementations of the subject disclosure.

One or more concepts described herein can be embodied in a system, such as represented in the example operations of FIG. 17, and for example can include at least one memory that stores computer executable components and/or operations, and at least one processor that executes computer executable components and/or operations stored in the memory. Example operations can include operation 1702, which represents obtaining, from an array of respective microphones arranged to sense noise of a device under test from different respective microphone locations, respective sensed audio signals for input to an audio signal processing engine that superimposes the respective sensed audio signals into noise profile data associated with the device under test. Example operation 1704 represents maintaining the noise profile data in a data store in association with information representative of the device under test. Example operation 1704 represents outputting design parameters, based on the noise profile data, for an acoustic metasurface that suppresses noise generated by the device under test.

The array of respective microphones can be located in an anechoic chamber.

Outputting the design parameters can include outputting a neck port dimension and a chamber dimension of a Helmholtz resonator for the acoustic metasurface.

Further operations can include printing the acoustic metasurface based on the design parameters.

Maintaining the noise profile data noise profile data can include maintaining information representative of at least one of: noise floor data representative of a floor associated with the noise, frequency data representative of at least one frequency corresponding to the noise, bandwidth data representative of at least one bandwidth corresponding to the noise, or amplitude data representative of at least one amplitude corresponding to the noise.

The device under test can include a server, and the information representative of the device under test can include at least one of: a server identifier, or feature data corresponding to hardware components of the server.

The feature data corresponding to the hardware components of the respective server devices can include at least one of: respective central processing unit type data representative of respective central processing unit types corresponding to the hardware components, respective memory data representative of respective memories corresponding to the hardware components, respective graphics processing unit data representative of respective graphics processing units corresponding to the hardware components, respective heatsink data representative of respective heatsinks corresponding to the hardware components, respective cooling fan data representative of respective cooling fans corresponding to the hardware components, respective chassis type data representative of respective chassis types corresponding to the hardware components, and respective bezel type data representative of respective bezel types corresponding to the hardware components.

Maintaining the noise profile data noise profile data can include maintaining information representative of a primary dominant peak frequency and a secondary dominant peak frequency, and outputting the design parameters can include outputting first neck port dimensions and first chamber dimensions of first Helmholtz resonators for the acoustic metasurface to suppress first noise corresponding to the primary dominant peak frequency, and outputting second neck port dimensions and second chamber dimensions of second Helmholtz resonators for the acoustic metasurface to suppress second noise corresponding to the secondary dominant peak frequency.

The array of respective microphones can be arranged in a substantially two-dimensional plane around the device under test, or the array of respective microphones can be arranged in a three-dimensional region around the device under test.

The noise profile data can be first noise profile data, the respective sensed audio signals can be respective first sensed audio signals, the device under test can be operated as a deployed device in a setup environment, and further operations can include, obtaining second noise profile data associated with the deployed device, and maintaining the second noise profile data in the data store in association with the identifier of the device under test as the deployed device.

Figure 18:
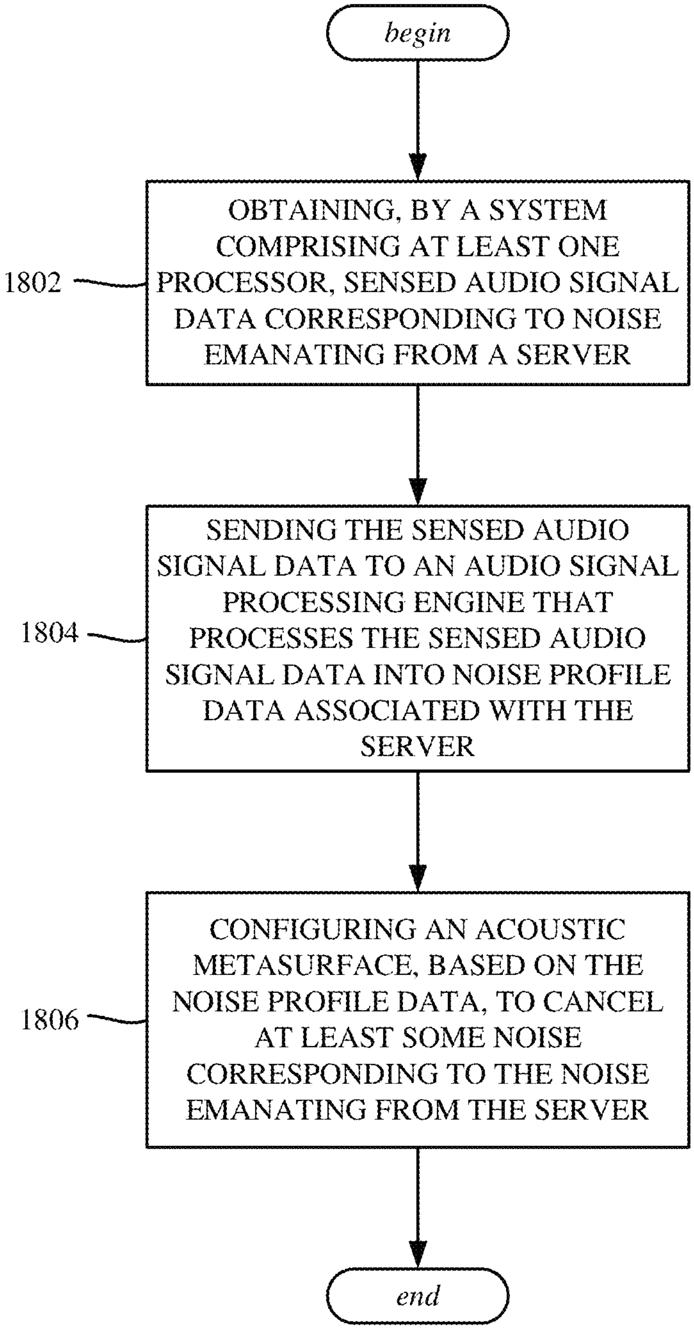
FIG. 18 is a flow diagram showing example operations related to configuring an acoustic metasurface based on the noise profile data to cancel noise emanating from a server, in accordance with various embodiments and implementations of the subject disclosure.

One or more example embodiments, such as corresponding to example operations of a method, can be represented in FIG. 18. Example operation 1802 represents obtaining, by a system comprising at least one processor, sensed audio signal data corresponding to noise emanating from a server. Example operation 1804 represents sending the sensed audio signal data to an audio signal processing engine that processes the sensed audio signal data into noise profile data associated with the server. Example operation 1806 represents configuring an acoustic metasurface, based on the noise profile data, to cancel at least some noise corresponding to the noise emanating from the server.

Further operations can include maintaining, by the system, the noise profile data in association with an identifier of the server.

Maintaining the noise profile data can include maintaining information representative of at least one of: noise floor data, frequency data, bandwidth data, or amplitude data.

The noise profile data can be first noise profile data, the sensed audio signals can be first sensed audio signals of the server sensed in a test environment, and further operations can include obtaining, by the system, second noise profile data associated with the server operated in a setup environment, and maintaining, by the system, the second noise profile data in the data store in association with the identifier of the device under test as the deployed device.

Configuring the acoustic metasurface can include outputting design parameters, based on the noise profile data, for the acoustic metasurface, and further operations can include communicating, by the system based on the design parameters, with a printer to print the acoustic metasurface.

Obtaining the sensed audio signal data can include sensing respective sensed audio signals via an array of respective microphones arranged to sense the respective sensed audio signals from different respective microphone locations proximate to the server.

Figure 19:
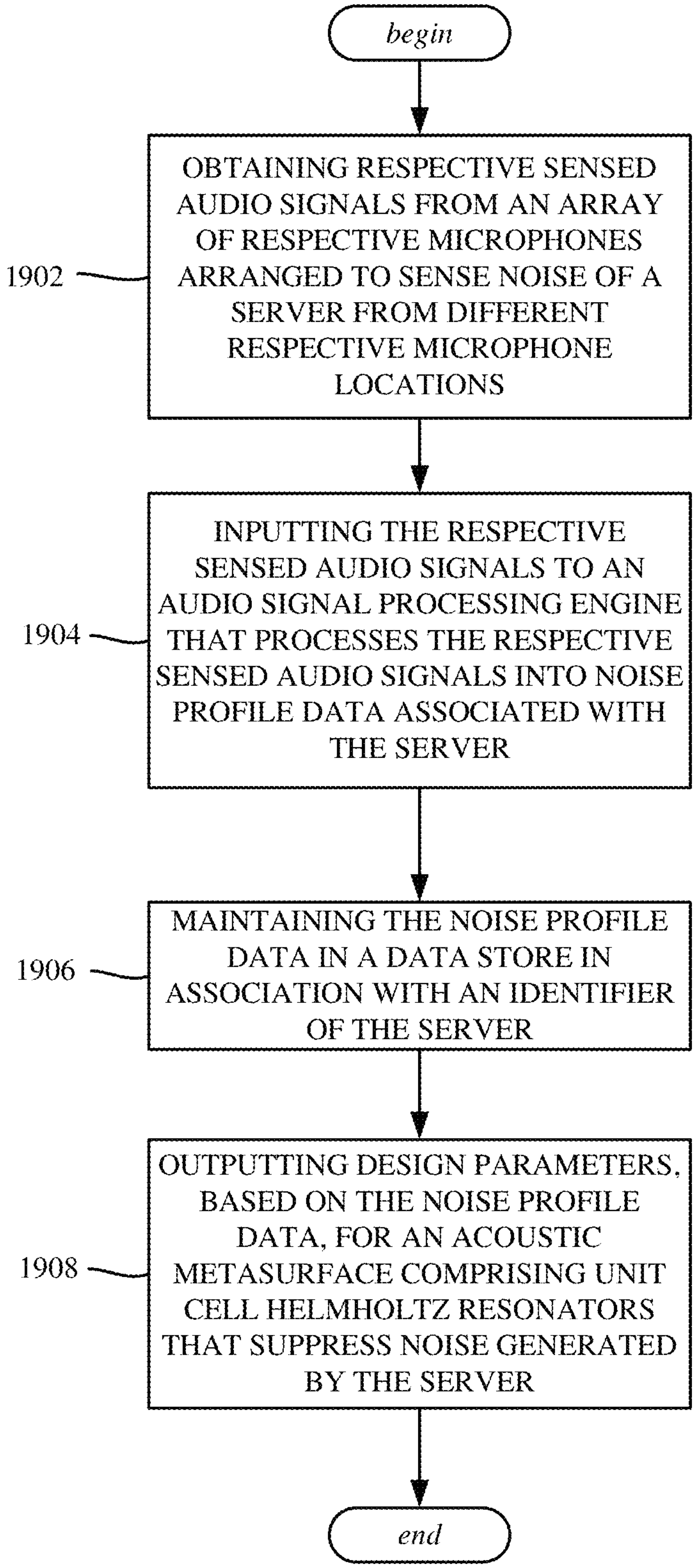
FIG. 19 is a flow diagram showing example operations related to obtaining noise profile data of a server from different microphone locations, for use in outputting acoustic metasurface design parameters, in accordance with various embodiments and implementations of the subject disclosure.

FIG. 19 summarizes various example operations, e.g., corresponding to a machine-readable medium, comprising executable instructions that, when executed by at least one processor, facilitate performance of operations. Example operation 1902 represents obtaining respective sensed audio signals from an array of respective microphones arranged to sense noise of a server from different respective microphone locations. Example operation 1904 represents inputting the respective sensed audio signals to an audio signal processing engine that processes the respective sensed audio signals into noise profile data associated with the server. Example operation 1906 represents maintaining the noise profile data in a data store in association with an identifier of the server. Example operation 1908 represents outputting design parameters, based on the noise profile data, for an acoustic metasurface comprising unit cell Helmholtz resonators that suppress noise generated by the server.

The noise profile data can be first noise profile data, the sensed audio signals can be first sensed audio signals of the server sensed in a test environment, and further operations can include obtaining, by the system, second noise profile data associated with the server operated in a setup environment, and maintaining, by the system, the second noise profile data in the data store in association with the identifier of the device under test as the deployed device.

Maintaining the noise profile data can include maintaining information representative of at least one of: noise floor data, frequency data, bandwidth data, or amplitude data.

Further operations can include controlling a printer to print the acoustic metasurface based on the design parameters.

As can be seen, the technology described herein facilitates capturing noise profile data of a test-measured server or similar device, which can be used for construction and deployment of a metasurface of unit cells to cancel noise corresponding to the noise profile data. The noise profile data for the device, and for other devices, can be maintained in a database and used for designing metasurfaces for similar, but unmeasured devices. Based on the technology described herein, thin, light-weight, and cost effective sound absorbers can be constructed, including by using 3D printing technology or the like.

As used in this application, the terms “component,” “system,” “platform,” “layer,” “selector,” “interface,” and the like are intended to refer to a computer-related resource or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

at least one processor; and at least one memory that stores executable instructions that, when executed by the at least one processor, facilitate performance of operations, the operations comprising:

obtaining, from an array of respective microphones arranged to sense noise of a device under test from different respective microphone locations, respective sensed audio signals for input to an audio signal processing engine that superimposes the respective sensed audio signals into noise profile data associated with the device under test;

maintaining the noise profile data in a data store in association with information representative of the device under test; and outputting design parameters, based on the noise profile data, for an acoustic metasurface that suppresses noise generated by the device under test, wherein the maintaining of the noise profile data comprises maintaining information representative of a primary dominant peak frequency and a secondary dominant peak frequency, and wherein the outputting of the design parameters comprises outputting first neck port dimensions and first chamber dimensions of first Helmholtz resonators for the acoustic metasurface to suppress first noise corresponding to the primary dominant peak frequency, and outputting second neck port dimensions and second chamber dimensions of second Helmholtz resonators for the acoustic metasurface to suppress second noise corresponding to the secondary dominant peak frequency.

2. The system of claim 1, wherein the array of respective microphones is located in an anechoic chamber.

3. The system of claim 1, wherein the operations further comprise printing the acoustic metasurface based on the design parameters.

4. The system of claim 1, wherein the maintaining of the noise profile data comprises maintaining information representative of at least one of: noise floor data representative of a floor associated with the noise, frequency data representative of at least one frequency corresponding to the noise, bandwidth data representative of at least one bandwidth corresponding to the noise, or amplitude data representative of at least one amplitude corresponding to the noise.

5. The system of claim 1, wherein the device under test comprises a server, and wherein the information representative of the device under test comprises at least one of: a server identifier, or feature data corresponding to hardware components of the server.

6. The system of claim 5, wherein the feature data corresponding to the hardware components of the respective server devices comprises at least one of: respective central processing unit type data representative of respective central processing unit types corresponding to the hardware components, respective memory data representative of respective memories corresponding to the hardware components, respective graphics processing unit data representative of respective graphics processing units corresponding to the hardware components, respective heatsink data representative of respective heatsinks corresponding to the hardware components, respective cooling fan data representative of respective cooling fans corresponding to the hardware components, respective chassis type data representative of respective chassis types corresponding to the hardware components, or respective bezel type data representative of respective bezel types corresponding to the hardware components.

7. The system of claim 1, wherein the array of respective microphones is arranged in a substantially two-dimensional plane around the device under test, or wherein the array of respective microphones is arranged in a three-dimensional region around the device under test.

8. The system of claim 1, wherein the noise profile data is first noise profile data, wherein the respective sensed audio signals are respective first sensed audio signals, wherein the device under test is operated as a deployed device in a setup environment, and wherein the operations further comprise, obtaining second noise profile data associated with the deployed device, and maintaining the second noise profile data in the data store in association with an identifier of the device under test as the deployed device.

9. A method, comprising:

obtaining, by a system comprising at least one processor, sensed audio signal data corresponding to noise emanating from a server;

sending the sensed audio signal data to an audio signal processing engine that processes the sensed audio signal data into noise profile data associated with the server;

configuring an acoustic metasurface, based on the noise profile data, to cancel at least some noise corresponding to the noise emanating from the server; and maintaining, by the system, the noise profile data in association with an identifier of the server, wherein the noise profile data is first noise profile data, wherein the sensed audio signal data are first sensed audio signals of the server sensed in a test environment, and further comprising obtaining, by the system, second noise profile data associated with the server operated in a setup environment, and maintaining, by the system, the second noise profile data in a data store in association with the identifier of the server under test as a deployed device.

10. The method of claim 9, wherein the maintaining of the noise profile data comprises maintaining information representative of at least one of: noise floor data, frequency data, bandwidth data, or amplitude data.

11. The method of claim 9, wherein the configuring of the acoustic metasurface comprises outputting design parameters, based on the noise profile data, for the acoustic metasurface, and further comprising communicating, by the system based on the design parameters, with a printer to print the acoustic metasurface.

12. The method of claim 9, wherein the obtaining of the sensed audio signal data comprises sensing respective sensed audio signals via an array of respective microphones arranged to sense the respective sensed audio signals from different respective microphone locations proximate to the server.

13. The method of claim 9, wherein the maintaining of the noise profile data comprises maintaining information representative of at least one of: noise floor data, frequency data, bandwidth data, or amplitude data.

14. A non-transitory machine-readable medium, comprising executable instructions that, when executed by at least one processor, facilitate performance of operations, the operations comprising:

obtaining respective sensed audio signals from an array of respective microphones arranged to sense noise of a server from different respective microphone locations;

inputting the respective sensed audio signals to an audio signal processing engine that processes the respective sensed audio signals into noise profile data associated with the server;

maintaining the noise profile data in a data store in association with an identifier of the server; and outputting design parameters, based on the noise profile data, for an acoustic metasurface comprising unit cell Helmholtz resonators that suppress noise generated by the server, wherein the noise profile data is first noise profile data, wherein the sensed audio signals are first sensed audio signals of the server sensed in a test environment, and wherein the operations further comprise:

obtaining second noise profile data associated with the server operated in a setup environment, and maintaining the second noise profile data in the data store in association with the identifier of the server under test as a deployed device.

15. The non-transitory machine-readable medium of claim 14, wherein the maintaining of the noise profile data comprises maintaining information representative of at least one of: noise floor data, frequency data, bandwidth data, or amplitude data.

16. The non-transitory machine-readable medium of claim 14, wherein the operations further comprise controlling a printer to print the acoustic metasurface based on the design parameters.

17. The non-transitory machine-readable medium of claim 14, wherein the array of respective microphones is located in an anechoic chamber.

18. The non-transitory machine-readable medium of claim 14, wherein the outputting of the design parameters further comprises outputting a neck port dimension for the acoustic metasurface.

19. The non-transitory machine-readable medium of claim 14, wherein information representative of the server under test comprises at least one of: a server identifier, or feature data corresponding to hardware components of the server.

20. The non-transitory machine-readable medium of claim 14, wherein the array of respective microphones is arranged in a substantially two-dimensional plane around the server under test, or wherein the array of respective microphones is arranged in a three-dimensional region around the server under test.

* * * * *